(12) United States Patent
Gimeno-Segovia et al.

(10) Patent No.: US 11,823,012 B2
(45) Date of Patent: Nov. 21, 2023

(54) PHOTONIC INTEGRATED CIRCUITS WITH CONTROLLABLE INTERFEROMETERS

(71) Applicant: Psiquantum, Corp., Palo Alto, CA (US)

(72) Inventors: Mercedes Gimeno-Segovia, San Jose, CA (US); Terence Rudolph, San Francisco, CA (US); Naomi Nickerson, San Francisco, CA (US)

(73) Assignee: Psiquantum, Corp., Palo Alto, CA (US)

( * ) Notice: Subject to any disclaimer, the term of this patent is extended or adjusted under 35 U.S.C. 154(b) by 0 days.

(21) Appl. No.: 18/120,328

(22) Filed: Mar. 10, 2023

(65) Prior Publication Data

US 2023/0229949 A1    Jul. 20, 2023

Related U.S. Application Data

(62) Division of application No. 17/808,979, filed on Jun. 24, 2022, which is a division of application No. 17/163,219, filed on Jan. 29, 2021.

(60) Provisional application No. 63/140,210, filed on Jan. 21, 2021, provisional application No. 62/967,513, filed on Jan. 29, 2020.

(51) Int. Cl.
*G06N 10/00* (2022.01)

(52) U.S. Cl.
CPC .................. *G06N 10/00* (2019.01)

(58) Field of Classification Search
None
See application file for complete search history.

(56) References Cited

U.S. PATENT DOCUMENTS

| 7,277,872 B2 | 10/2007 | Raussendorf et al. |
| 7,554,080 B2 | 6/2009 | Munro et al. |
| 9,178,154 B2 | 11/2015 | Bunyk |

(Continued)

FOREIGN PATENT DOCUMENTS

| EP | 3109803 B1 | 7/2020 |
| JP | 2016504002 A | 2/2016 |

(Continued)

OTHER PUBLICATIONS

Psiquantum Corp., Psiquantum Webpage from Apr. 2020 Disclosing Cornell University Paper, Accessed from Internet on Apr. 20, 2021, 8 pages.

(Continued)

*Primary Examiner* — Sung H Pak
(74) *Attorney, Agent, or Firm* — Kilpatrick Townsend & Stockton LLP

(57) ABSTRACT

A method includes receiving a plurality of quantum systems, wherein each quantum system of the plurality of quantum system includes a plurality of quantum sub-systems in an entangled state, and wherein respective quantum systems of the plurality of quantum systems are independent quantum systems that are not entangled with one another. The method further includes performing a plurality of joint measurements on different quantum sub-systems from respective ones of the plurality of quantum systems, wherein the joint measurements generate joint measurement outcome data and determining, by a decoder, a plurality of syndrome graph values based on the joint measurement outcome data.

8 Claims, 22 Drawing Sheets

(56) References Cited

U.S. PATENT DOCUMENTS

| | | | |
|---|---|---|---|
| 11,263,076 | B2 | 3/2022 | Nickerson et al. |
| 2009/0078931 | A1 | 3/2009 | Berkley |
| 2011/0175062 | A1 | 7/2011 | Farinelli et al. |
| 2012/0155870 | A1 | 6/2012 | Harrison et al. |
| 2014/0355998 | A1 | 12/2014 | Tanzilli et al. |
| 2016/0112066 | A1 | 4/2016 | Ashikhmin |
| 2016/0245639 | A1* | 8/2016 | Mower ............ B82Y 20/00 |
| 2016/0267032 | A1 | 9/2016 | Rigetti et al. |
| 2016/0344414 | A1 | 11/2016 | Naaman et al. |
| 2017/0141287 | A1 | 5/2017 | Barkeshli et al. |
| 2018/0013426 | A1 | 1/2018 | Deurloo et al. |
| 2020/0287631 | A1 | 9/2020 | Gimeno-Segovia et al. |

FOREIGN PATENT DOCUMENTS

| | | | |
|---|---|---|---|
| WO | 2019178009 | A1 | 9/2019 |
| WO | 2019183602 | A1 | 9/2019 |
| WO | 2020033588 | A1 | 2/2020 |

OTHER PUBLICATIONS

"Quantum Computing: Progress and Prospects", The National Academies of Sciences, Engineering, and Medicine, 2019, pp. 156-192.
U.S. Appl. No. 17/163,219 , Advisory Action, dated Nov. 16, 2021, 11 pages.
U.S. Appl. No. 17/163,219 , Final Office Action, dated Aug. 13, 2021, 29 pages.
U.S. Appl. No. 17/163,219 , Non-Final Office Action, dated Oct. 6, 2022, 13 pages.
U.S. Appl. No. 17/163,219 , Non-Final Office Action, dated Apr. 27, 2021, 15 pages.
U.S. Appl. No. 17/808,979 , Non-Final Office Action, dated Sep. 23, 2022, 17 pages.
Aharonov et al., "Fault-Tolerant Quantum Computation with Constant Error Rate", SIAM Journal on Computing, vol. 38, No. 4, 2008, pp. 1207-1282.
Auger et al., "Fault-Tolerant Quantum Computation with Non-Deterministic Entangling Gates", Physical Review A, vol. 97, Mar. 16, 2018, pp. 1-5.
Barkeshli et al., "Modular Transformations Through Sequences of Topological Charge Projections", Physical Review B, vol. 94, Jan. 19, 2017, pp. 1-21.
Barrett et al., "Fault Tolerant Quantum Computation with Very High Threshold for Loss Errors", Physical Review Letters, vol. 105, No. 20, Nov. 15, 2010, pp. 1-4.
Bartolucci et al., "Fusion-Based Quantum Computation", Available Online at: https://arxiv.org/pdf/2101.09310.pdf, Jan. 22, 2021, pp. 1-25.
Blais et al., "Circuit Quantum Electrodynamics", Reviews of Modern Physics, vol. 93, May 19, 2021, pp. 1-82.
Bolt et al., "Foliated Quantum Error-Correcting Codes", Physical Review Letters, vol. 117, Aug. 12, 2016, pp. 070501-1-070501-6.
Bombin et al., "Quantum Measurements and Gates by Code Deformation", Journal of Physics A Mathematical and Theoretical, vol. 42, No. 9, Feb. 25, 2009, pp. 1-19.
Bombin, "Single-Shot Fault-Tolerant Quantum Error Correction", Physical Review X, vol. 5, Sep. 28, 2015, pp. 031043-1-031043-26.
Bombin, "Topological Order with a Twist: Ising Anyons from an Abelian Model", Physical Review Letters, vol. 105, Jul. 28, 2010, pp. 1-5.
Bourassa et al., "Blueprint for a Scalable Photonic Fault-Tolerant Quantum Computer", Quantum, vol. 5, Feb. 2, 2021, pp. 1-38.
Braunstein et al., "Quantum Information with Continuous Variables", Reviews of Modern Physics, vol. 77, Jun. 2005, pp. 1-65.
Braunstein et al., "Teleportation of Continuous Quantum Variables", Physical Review Letters, vol. 80, No. 4, Jan. 26, 1998, pp. 869-872.
Bravyi et al., "Quantum Codes on a Lattice with Boundary", Available Online at: https://arxiv.org/pdf/quant-ph/9811052.pdf, Nov. 20, 1998, pp. 1-6.
Briegel et al., "Measurement-Based Quantum Computation", Nature Physics, vol. 5, Oct. 9, 2009, pp. 1-20.
Brown et al., "Universal Fault-Tolerant Measurement-Based Quantum Computation", Physical Review Research, vol. 2, Aug. 25, 2020, pp. 1-30.
Browne et al., "Resource-Efficient Linear Optical Quantum Computation", Physical Review Letters, vol. 95, No. 1, Feb. 9, 2005, pp. 1-5.
Bruzewicz et al., "Trapped-Ion Quantum Computing: Progress and Challenges", Applied Physics Reviews, vol. 6, No. 2, Apr. 8, 2019, pp. 1-56.
Castellanos, "PsiQuantum Raises $450 Million to Build Its Quantum Computer", The Wall Street Journal, Jul. 27, 2021, 4 pages.
Chamberland et al., "Fault-Tolerant Quantum Computing in the Pauli or Clifford Frame with Slow Error Diagnostics", Quantum, vol. 2, Dec. 25, 2017, pp. 1-11.
Chao et al., "Optimization of the Surface Code Design for Majorana-Based Qubits", Quantum, vol. 4, Oct. 26, 2020, pp. 1-19.
Cirac et al., "Quantum Computations with Cold Trapped Ions", Physical Review Letters, vol. 74, No. 20, May 15, 1995, pp. 4091-4094.
Das et al., "A Scalable Decoder Micro-Architecture for Fault-Tolerant Quantum Computing", Available Online at: https://arxiv.org/pdf/2001.06598.pdf, Jan. 18, 2020, pp. 1-19.
Dawson et al., "Noise Thresholds for Optical Quantum Computers", Physical Review Letters, vol. 96, Jan. 17, 2006, pp. 1-5.
Delfosse et al., "Almost-Linear Time Decoding Algorithm for Topological Codes", Available Online at: https://arxiv.org/pdf/1709.06218.pdf, Sep. 19, 2017, pp. 1-10.
Delfosse , "Hierarchical Decoding to Reduce Hardware Requirements for Quantum Computingg", Available Online at: https://arxiv.org/pdf/2001.11427.pdf, Jan. 30, 2020, pp. 1-8.
Dennis et al., "Topological Quantum Memory", Journal of Mathematical Physics, vol. 43, No. 9, Oct. 24, 2001, pp. 1-39.
Dyakonov, "The Case Against Quantum Computing", Institute of Electrical and Electronics Engineers Spectrum, Nov. 15, 2018, pp. 1-14.
Edmonds, "Paths, Trees, and Flowers", National Bureau of Standards and Princeton University, 1965, pp. 449-467.
Ewert et al., "3/4-Efficient Bell Measurement with Passive Linear Optics and Unentangled Ancillae", Physical Review Letters, vol. 113, No. 14, Sep. 30, 2014, pp. 1-8.
Fujisaki et al., "A Practical and Scalable Decoder for Topological Quantum Error Correction with Digital Annealer", Available Online at: https://arxiv.org/pdf/2203.15304.pdf, Sep. 9, 2022, pp. 1-12.
Gimeno-Segovia et al., "From Three-Photon GHZ States to Universal Ballistic Quantum Computation", Physical Review Letters, vol. 115, Feb. 26, 2015, pp. 1-9.
Gimeno-Segovia et al., "Relative Multiplexing for Minimising Switching in Linear-Optical Quantum Computing", New Journal of Physics, vol. 19, Available Online at: https://iopscience.iop.org/articie/10.1088/1367-2630/aa7095, Jun. 6, 2017, pp. 1-13.
Glancy et al., "Error Analysis for Encoding a Qubit in an Oscillator", Physical Review A, vol. 73, No. 1, Jan. 19, 2006, pp. 012325-1-012325-5.
Gottesman, "A Class of Quantum Error-Correcting Codes Saturating the Quantum Hamming Bound", Physical Review A, vol. 54, No. 3, Sep. 1, 1996, pp. 1-22.
Gottesman et al., "Encoding a Qubit in an Oscillator", Physical Review A, vol. 64, No. 1, May 13, 2001, pp. 1-22.
Gottesman, "Fault-Tolerant Quantum Computation with Constant Overhead", Quantum Information & Computation, vol. 14, Nos. 15-16, Nov. 1, 2014, pp. 1-33.
Gottesman et al., "Quantum Teleportation is a Universal Computational Primitive", Available Online at: https://arxiv.org/pdf/quant-ph/9908010.pdf, Aug. 2, 1999, pp. 1-6.
Grice, "Arbitrarily Complete Bell-State Measurement Using Only Linear Optical Elements", Physical Review A, vol. 84, No. 4, Oct. 2011, pp. 042331-1-042331-6.
Hein et al., "Multiparty Entanglement in Graph States", Physical Review A, vol. 69, Jun. 9, 2004, pp. 062311-1-062311-20.

(56) References Cited

OTHER PUBLICATIONS

Herr et al., "A Local and Scalable Lattice Renormalization Method for Ballistic Quantum Computation", NPJ Quantum Information, vol. 4, No. 27, Jun. 21, 2018, pp. 1-8.
Herrera-Marti et al., "A Photonic Implementation for the Topological Cluster State Quantum Computer", Physical Review A, vol. 82, No. 3, May 17, 2010, pp. 1-7.
Horgan, "Will Quantum Computing Ever Live Up to Its Hype?", Scientific American, Apr. 20, 2021, 10 pages.
Horsman et al., "Surface Code Quantum Computing by Lattice Surgery", New Journal of Physics, vol. 14, Dec. 7, 2012, pp. 1-27.
Huo et al., "Learning Time-Dependent Noise To Reduce Logical Errors: Real Time Error Rate Estimation In Quantum Error Correction", New Journal of Physics. vol. 19, No. 12, Dec. 13, 2017, 11 pages.
Kane, "A Silicon-Based Nuclear Spin Quantum Computer", Nature, vol. 393, 1998, pp. 133-137.
Kastoryano et al., "Dissipative Preparation of Entanglement in Optical Cavities", Physical Review Letters, vol. 106, Feb. 28, 2011, pp. 1-4.
Kieling et al., "Percolation, Renormalization, and Quantum Computing with Non-Deterministic Gates", Physical Review Letters, vol. 99, No. 13, Jul. 20, 2007, pp. 1-5.
Kjaergaard et al., "Superconducting Qubits: Current State of Play", Annual Reviews of Condensed Matter Physics, vol. 11, Apr. 21, 2020, pp. 1-30.
Knill et al., "Efficient Linear Optics Quantum Computation", Available Online at: https://arxiv.org/pdf/quant-ph/0006088.pdf, Jun. 20, 2000, pp. 1-8.
Knill, "Fault-Tolerant Postselected Quantum Computation: Threshold Analysis", Available Online at: https://arxiv.org/pdf/quant-ph/0404104.pdf, Apr. 19, 2004, pp. 1-21.
Koch et al., "Charge Insensitive Qubit Design Derived from the Cooper Pair Box", Physical Review A, vol. 76, Sep. 26, 2007, pp. 1-21.
Kolmogorov, "Blossom V: A New Implementation of A Minimum Cost Perfect Matching Algorithm". Mathematical Programming Computation, vol. 1, No. 1, Apr. 21, 2009, pp. 1-15.
Krauter et al., "Entanglement Generated by Dissipation", International Conference on Quantum Information, Jun. 22, 2010, pp. 1-9.
Leung, "Quantum Computation by Measurements", International Journal of Quantum Information, vol. 2, No. 1, Feb. 27, 2004, pp. 1-10.
Li et al., "Resource Costs for Fault-Tolerant Linear Optical Quantum Computing", Physical Review X, vol. 5, No. 4, Apr. 22, 2015, pp. 1-13.
Litinski "A Game of Surface Codes: Large-Scale Quantum Computing with Lattice Surgery", Quantum, vol. 3, Mar. 5, 2019, pp. 1-37.
Loss et al., "Quantum Computation with Quantum Dots", Physical Review A, vol. 57, Jan. 1, 1998, pp. 1-20.
Molmer et al., "Multi-Particle Entanglement of Hot Trapped Ions", Physical Review Letters, vol. 82, No. 9, Mar. 1, 1999, pp. 1-4.
Nayak et al., "Non-Abelian Anyons and Topological Quantum Computation", Reviews of Modern Physics, vol. 80, No. 3, Mar. 28, 2008, pp. 1-73.
Newman et al., "Generating Fault-Tolerant Cluster States from Crystal Structures", Quantum, vol. 4, Jul. 9, 2020, pp. 1-37.
Nickerson et al., "Measurement Based Fault Tolerance Beyond Foliation", PsiQuantum, Oct. 23, 2018, pp. 1-16.
Nielsen, "Optical Quantum Computation Using Cluster States", Physical Review Letters, vol. 93, No. 4, Feb. 2, 2004, pp. 1-4.
Nielsen, "Universal Quantum Computation Using Only Projective Measurement, Quantum Memory, and Preparation of the |0> State", Physics Letters A, vol. 308, Nos. 2-3, Aug. 6, 2001, pp. 1-4.
Pant et al., "Percolation Thresholds for Photonic Quantum Computing", Nature Communications, vol. 10, Mar. 6, 2019, pp. 1-12.
Application No. PCT/US2020/038962, International Preliminary Report on Patentability, dated Dec. 30, 2021, 9 pages.
Application No. PCT/US2020/038962, International Search Report and Written Opinion, dated Oct. 13, 2020, 12 pages.
PCT/US2020/038962, "Invitation to Pay Additional Fees and, Where Applicable, Protest Fee", dated Aug. 3, 2020, 2 pages.
Application No. PCT/US2021/015903, International Preliminary Report on Patentability, dated Aug. 11, 2022, 5 pages.
Application No. PCT/US2021/015903, International Search Report and Written Opinion, dated May 18, 2021, 8 pages.
Application No. PCT/US2022/013578, International Search Report and Written Opinion, dated Apr. 27, 2022, 7 pages.
Politi et al., "Integrated Quantum Photonics", IEEE Journal of Selected Topics in Quantum Electronics, vol. 15, No. 6, 2009, pp. 1-12.
Preskill, "Quantum Computing in the NISQ Era and Beyond", Quantum Journal, vol. 2, No. 79, Jul. 2018, pp. 1-20.
Preskill, "Quantum Computing in the NISQ Era and Beyond", Available Online at: https://arxiv.org/pdf/1801.00862.pdf, Quantum Journal, vol. 2, No. 79, Jul. 2018, pp. 1-20.
Raussendorf et al., "A Fault-Tolerant One-Way Quantum Computer", Annals of Physics, vol. 321, No. 9, Sep. 2006, pp. 1-26.
Raussendorf et al., "Computational Model Underlying the One-Way Quantum Computer", Quantum Information & Computation, vol. 2, No. 6, Mar. 12, 2002, pp. 1-37.
Riesebos et al., "Pauli Frames for Quantum Computer Architectures", Proceedings of the 54th Annual Design Automation Conference, Jun. 2017, 6 pages.
Shor, "Scheme for Reducing Decoherence in Quantum Computer Memory", Physical Review A, Third Series, vol. 52, No. 4, Oct. 1995, pp. R2493-R2496.
Spitz et al., "Adaptive Weight Estimator for Quantum Error Correction in a Time-dependent Environment", Advanced Quantum Technologies, vol. 1, No. 1, 180012, Jul. 30, 2018, p. 1-8.
Tillich et al., "Quantum LDPC Codes With Positive Rate and Minimum Distance Proportional to n. 1/2", ISIT'09: Proceedings of the 2009 IEEE international conference on Symposium on Information Theory, vol. 60, No. 2, Jun. 2009, pp. 1-21.
Vasmer et al., "Cellular Automaton Decoders for Topological Quantum Codes with Noisy Measurements and Beyond", Scientific Reports, Nature Research, Available Online at: https://www.nature.com/articles/s41598-021-81138-2, Jan. 25, 2021, 14 pages.
Verstraete et al., "Quantum Computation, Quantum State Engineering, and Quantum Phase Transitions Driven by Dissipation", Nature Physics, vol. 5, Mar. 12, 2008, pp. 1-7.
Verstraete et al., "Renormalization Algorithms for Quantum—Many Body Systems in Two and Higher Dimensions", Available Online at: https://arxiv.org/pdf/cond-mat/0407066.pdf, Jul. 2, 2004, pp. 1-5.
Webster et al., "Fault-Tolerant Quantum Gates With Defects in Topological Stabilizer Codes", Physical Review A, vol. 102, Aug. 6, 2020, pp. 1-28.
U.S. Appl. No. 17/163,219, Final Office Action, dated Apr. 20, 2023, 14 pages.
Ball, "First 100-Qubit Quantum Computer Enters Crowded Race", Nature, vol. 599, Nov. 19, 2021, p. 542.
Nielsen et al., "Quantum Computation and Quantum Information", Cambridge University Press, www.cambridge.org/9781107002173, ISBN 978-1-107-00217-3, 2010, pp. 17, 277, 202, 344.

\* cited by examiner

Layer 1, 3
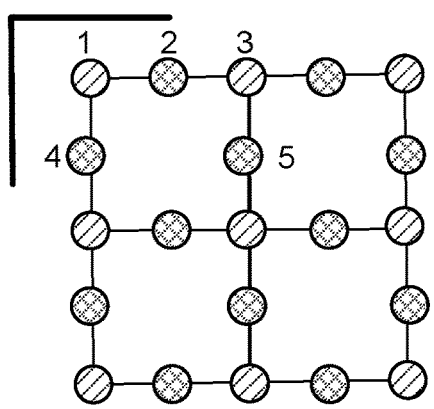
FIG. 10B
Layer 2, 4
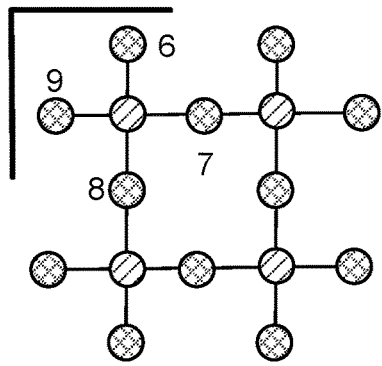
FIG. 10C
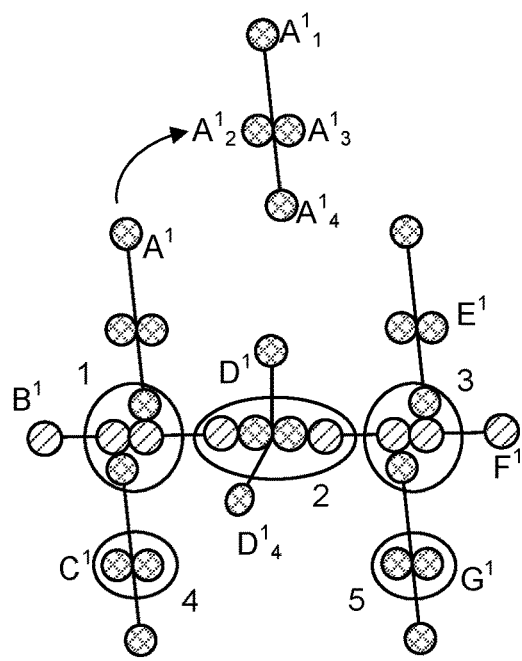
FIG. 10D
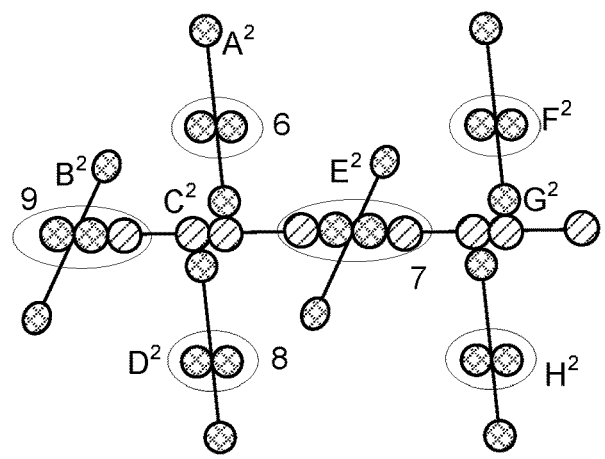
FIG. 10E
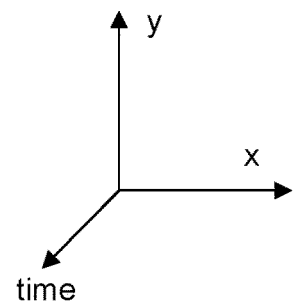

PHOTONIC INTEGRATED CIRCUITS WITH CONTROLLABLE INTERFEROMETERS

CROSS-REFERENCE TO RELATED APPLICATIONS

This patent application is a divisional of U.S. patent application Ser. No. 17/808,979, filed Jun. 24, 2022; which is a divisional of U.S. patent application Ser. No. 17/163,219, filed Jan. 29, 2021, which claims the benefit of U.S. Provisional Patent Application No. 62/967,513, filed Jan. 29, 2020, and also claims the benefit of U.S. Provisional Patent Application No. 63/140,210, filed Jan. 21, 2021. The disclosures of all of these applications are hereby incorporated by reference in their entirety for all purposes.

TECHNICAL FIELD

One or more embodiments of the present disclosure relate generally to quantum computing devices and methods and, more specifically, to fault tolerant quantum computing devices and methods.

BACKGROUND

In fault tolerant quantum computing, quantum error correction is required to avoid an accumulation of qubit errors that then leads to erroneous computational outcomes. One method of achieving fault tolerance is to employ error correcting codes (e.g., topological codes) for quantum error correction. More specifically, a collection of physical qubits can be generated in an entangled state (also referred to herein as an error correcting code) that encodes for a single logical qubit that is protected from errors.

In some quantum computing systems, cluster states of multiple qubits, or, more generally, graph states can be used as the error correcting code. A graph state is a highly entangled multi-qubit state that can be represented visually as a graph with nodes representing qubits and edges representing entanglement between the qubits. However, various problems that either inhibit the generation of entangled states or destroy the entanglement once created have frustrated advancements in quantum technologies that rely on the use of highly entangled quantum states.

Furthermore, in some qubit architectures, e.g., photonic architectures, the generation of entangled states of multiple qubits is an inherently probabilistic process that may have a low probability of success.

Accordingly, there remains a need for improved systems and methods for quantum computing that do not necessary rely on large cluster states of qubits.

SUMMARY

Described herein are embodiments of fault-tolerant systems and methods for quantum computing that do not necessary rely on large cluster states of qubits.

According to some embodiments, a method can comprise: receiving a plurality of quantum systems, wherein each quantum system of the plurality of quantum system includes a plurality of quantum sub-systems in an entangled state, and wherein respective quantum systems of the plurality of quantum systems are independent quantum systems that are not entangled with one another; performing a plurality of destructive joint measurements (such as fusion operations) on different quantum sub-systems from respective ones of the plurality of quantum systems, wherein the destructive joint measurements destroy the different quantum sub-systems and generate joint measurement outcome data and transfer quantum state information from the different quantum sub-systems to other unmeasured quantum sub-systems from the plurality of quantum systems; and determining a logical qubit state based on the joint measurement outcome data. The logical qubit state can be determined in a fault tolerant manner.

According to some embodiments, a method can comprise: receiving a plurality of quantum systems, wherein each quantum system of the plurality of quantum system includes a plurality of quantum sub-systems in an entangled state, and wherein respective quantum systems of the plurality of quantum systems are independent quantum systems that are not entangled with one another; performing a logical qubit gate by performing a plurality of destructive joint measurements (such as fusion operations) on different quantum sub-systems from respective ones of the plurality of quantum systems, wherein the destructive joint measurements destroy the different quantum sub-systems and generate joint measurement outcome data and transfer quantum state information from the different quantum sub-systems to other unmeasured quantum sub-systems from the plurality of quantum systems; and determining a result of the logical qubit gate based on the joint measurement outcome data. The result of the logical qubit gate can be determined in a fault tolerant manner.

According to some embodiments, a quantum computing apparatus can comprise: a qubit entangling system to generate a plurality of quantum systems, wherein each quantum system of the plurality of quantum systems includes a plurality of quantum sub-systems in an entangled state, and wherein respective quantum systems of the plurality of quantum systems are independent quantum systems that are not entangled with one another; a qubit fusion system to perform a plurality of destructive joint measurements on different quantum sub-systems from respective ones of the plurality of quantum systems, wherein the destructive joint measurements destroy the different quantum sub-systems and generate joint measurement outcome data and transfer quantum state information from the different quantum sub-systems to other unmeasured quantum sub-systems from the plurality of quantum systems; and a classical computing system to determine a logical qubit state based on the joint measurement outcome data.

According to some embodiments, a quantum computing apparatus can comprise: a qubit entangling system to generate a plurality of quantum systems, wherein each quantum system of the plurality of quantum systems includes a plurality of quantum sub-systems in an entangled state, and wherein respective quantum systems of the plurality of quantum systems are independent quantum systems that are not entangled with one another; a qubit fusion system to perform a logical qubit gate by performing a plurality of destructive joint measurements on different quantum sub-systems from respective ones of the plurality of quantum systems, wherein the destructive joint measurements destroy the different quantum sub-systems and generate joint measurement outcome data and transfer quantum state information from the different quantum sub-systems to other unmeasured quantum sub-systems from the plurality of quantum systems; and a classical computing system to determine a result of the logical qubit gate based on the joint measurement outcome data.

According to some embodiments a method includes receiving, by a qubit fusion system, a plurality of quantum systems, wherein each quantum system of the plurality of quantum system includes a plurality of quantum sub-systems in an entangled state. Respective quantum systems of the plurality of quantum systems are independent quantum systems that are not entangled with one another. The method further includes performing, by the qubit fusion system, a plurality of joint measurements on different quantum sub-systems from respective ones of the plurality of quantum systems. The joint measurements generate joint measurement outcome data. The method further includes determining, by a decoder, a plurality of syndrome graph values based on the joint measurement outcome data.

According to some embodiments performing the joint measurements includes performing fusion operations.

According to some embodiments performing the joint measurements include performing a destructive joint measurement via a Type II fusion operation.

According to some embodiments performing the plurality of joint measurements on different quantum sub-systems from respective ones of the plurality of quantum systems includes performing the plurality of joint measurements on only a subset of the plurality of quantum sub-systems that are received by the qubit fusion system thereby resulting in a subset of unmeasured quantum sub-systems.

According to some embodiments, the method further includes, receiving, by the qubit fusion system, a second plurality of quantum systems, wherein each quantum system of the second plurality of quantum system includes a second plurality of quantum sub-systems in an entangled state, and wherein respective quantum systems of the second plurality of quantum systems are independent quantum systems that are not entangled with one another. The method further includes receiving the subset of unmeasured quantum sub-systems and performing, by the qubit fusion system, a second plurality of joint measurements between i) second quantum sub-systems from respective ones of the plurality of second quantum systems and ii) respective quantum sub-systems from the subset of unmeasured quantum sub-systems. The second plurality of joint measurements generates second joint measurement outcome data.

According to some embodiments a system includes a qubit fusion system comprising a plurality of fusion gates. The qubit fusion system is configured to receive a plurality of quantum systems, wherein each quantum system of the plurality of quantum system includes a plurality of quantum sub-systems in an entangled state, and wherein respective quantum systems of the plurality of quantum systems are independent quantum systems that are not entangled with one another.

According to some embodiments the plurality of fusion gates are each configured to perform a joint measurement on different quantum sub-systems from respective ones of the plurality of quantum systems, wherein the joint measurements generate joint measurement outcome data.

The system further includes a decoder communicatively coupled to the qubit fusion system and configured to receive the joint measurement outcome data and to determine a plurality of syndrome graph values based on the joint measurement outcome data.

According to some embodiments the fusion gates include a photonic circuit and the plurality of quantum systems comprise photons as the quantum sub-systems, wherein the photonic circuit comprises a Type II fusion gate.

According to some embodiments the joint measurement comprises a two-particle projective measurement onto a Bell basis.

According to some embodiments the system further includes a quantum memory, coupled to at least one the qubit fusion system and that receive and store a subset of the plurality of quantum sub-systems.

According to some embodiments the quantum memory is an optical fiber.

According to some embodiments the quantum memory is coupled to the qubit fusion system such that the joint measurement is performed between i) quantum sub-systems from respective ones of the plurality of quantum systems and ii) respective quantum sub-systems from the subset of the plurality of quantum sub-systems that are stored in the quantum memory.

According to some embodiments the system of further includes a qubit entangling system that is configured to generate the plurality of quantum systems.

According to some embodiments the qubit entangling system includes a quantum gate array.

According to some embodiments the qubit entangling system includes a photon source system that is optically connected to an entangled state generator.

According to some embodiments the entangled state generator is configured to receive output photons from the photon source system and convert the output photons to an entangled photonic state.

According to some embodiments the qubit entangling system includes a plurality of output waveguides that are optically coupled to the qubit fusion system and are configured to provide the entangled photonic state to inputs of the fusion gates.

The following detailed description, together with the accompanying drawings, will provide a better understanding of the nature and advantages of the claimed invention.

BRIEF DESCRIPTION OF THE DRAWINGS

Aspects of the present disclosure are illustrated by way of example. Non-limiting and non-exhaustive aspects are described with reference to the following figures, wherein like reference numerals refer to like parts throughout the various figures unless otherwise specified.

FIGS. 10A-10E shows a flow chart and example lattice preparation protocol for illustrating a method for fusion based quantum computing in accordance with one or more embodiments.

DETAILED DESCRIPTION

Figure 1A:
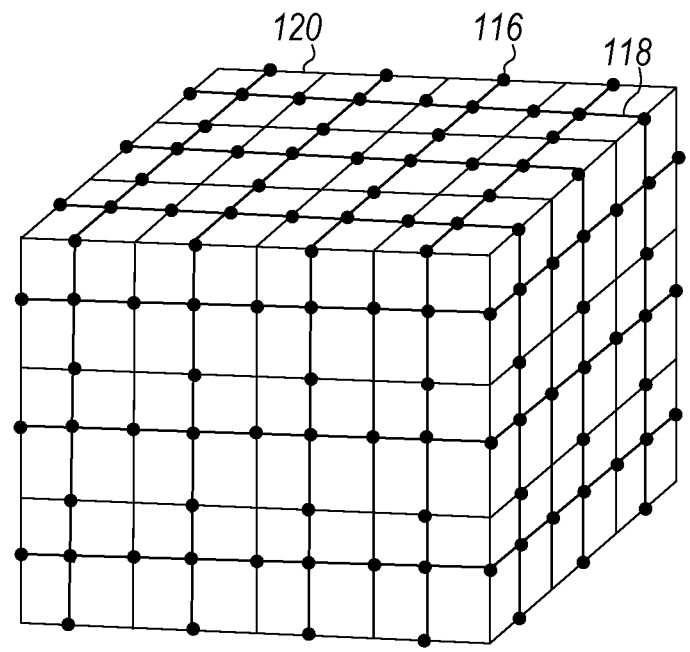
FIGS. 1A-1C are diagrams illustrating a cluster state and corresponding syndrome graph for an entangled state of physical qubits in accordance with some embodiments.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

1. Introduction to Quantum Computing

Quantum computation is often considered in the framework of 'Circuit Based Quantum Computation' (CBQC) in which operations (or gates) are performed on physical qubits. Gates can be either single qubit unitary operations (rotations), two qubit entangling operations such as the CNOT gate, or other multi-qubit gates such as the Toffoli gate.

Measurement Based Quantum Computation (MBQC) is another approach to implementing quantum computation. In the MBQC approach, computation proceeds by first preparing a particular entangled state of many qubits, commonly referred to as a cluster state, and then carrying out a series of single qubit measurements on the cluster state to enact the quantum computation. In this approach, the choice of single qubit measurements is dictated by the quantum algorithm being run on the quantum computer. In the MBQC approach, fault tolerance can be achieved by careful design of the cluster state and using the topology of this cluster state to encode logical qubits that is protected against any logical errors that may be caused by errors on any of the physical qubits that make up the cluster state. In practice, the value of the logical qubit can be determined, i.e., read out, based on the results (also referred to herein as measurement outcomes) of the single-particle measurements that are made on the cluster state's physical qubits as the computation proceeds.

However, the generation and maintenance of long-range entanglement across the cluster state and subsequent storage of large cluster states can be a challenge. For example, for any physical implementation of the MBQC approach, a cluster state containing many thousands, or more, of mutually entangled qubits must be prepared and then stored for some period of time before the single-qubit measurements are performed. For example, to generate a cluster state representing a single logical error corrected Qubit, each of the collection of underlying physical qubits can be prepared in the $|+\rangle$ state and a controlled-phase gate (CZ) state can be applied between each physical qubit pair to generate the overall cluster state. More explicitly, a cluster state of highly entangled qubits can be described by the undirected graph G=(V, E) with V and E denoting the sets of vertices and edges, respectively and can be generated as follows: 1) initialize all the physical qubits to be in the $|+\rangle$ state, where $$|+\rangle = \frac{(|0\rangle + |1\rangle)}{\sqrt{2}};$$

and 2) apply the controlled-phase gate (CZ) to each pair i,j of qubits. Accordingly, any cluster state, which physically corresponds to a large entangled state of physical qubits, can be described as $$|\Psi\rangle_{graph} = \Pi_{(i,j) \in E} CZ_{i,j} |+\rangle^{\otimes |V|} \quad (1)$$

where the $CZ_{i,j}$ is the controlled phase gate operator and with V and E as defined above. Graphically, the cluster states defined by Eq. (1) can also be represented by a graph with vertices V that represent the physical qubits (initialized in the $|+\rangle$ state) and edges E that represent entanglement between them (i.e., the application of the various CZ gates). In some cases, e.g., cases involving a fault tolerant MBQC scheme, $|\Psi\rangle_{graph}$ can take the form of graph in 3 dimensions. Like the examples shown in FIG. 1A and FIG. 7C, such a graph can have a regular structure formed from repeating unit cells and is therefore often referred to as a "lattice." When represented as a 3-dimensional lattice, 2-dimensional boundaries of this lattice can be identified. Qubits belonging to those boundaries are referred to as "boundary qubits" while all other qubits are referred to as "bulk qubits".

After $|\Psi\rangle_{graph}$ is generated, this large state of mutually entangled qubits must be preserved long enough for a stabilizer measurement to be performed, e.g., by making X measurements on all physical qubits in the bulk of the lattice and Z measurements on the boundary qubits.

FIG. 1A shows one example of a fault tolerant cluster state that can be used in MBQC, the topological cluster state introduced by Raussendorf et al., and commonly referred to as the Raussendorf Lattice as described in further detail in Robert Raussendorf, Jim Harrington, and Kovid Goyal. A., *Fault-Tolerant One-Way Quantum Computer*, Annals of Physics, 321(9):2242-2270, 2006. The cluster state is in the form of repeating lattice cells (e.g., cell 120) with physical qubits (e.g., physical qubit 116) arranged on the faces and edges of the cells. Entanglement between the physical qubits is represented by edges that connect the physical qubits (e.g., edge 118), with each edge representing the application of the CZ gate, as described above in reference to Eq. (1). The cluster state shown here is merely one example among many and other topological error correcting codes can be used without departing from the scope of the present disclosure. For example, volume codes such as those disclosed within International Patent Application Publication No. WO/2019/173651, the contents of which is hereby incorporated by reference in its entirety for all purposes, can be used. Also the codes based on non-cubical unit cells described in International Patent Application Publication No. WO/2019/178009, the contents of which is hereby incorporated by reference in its entirety for all purposes, can be used without departing from the scope of the present disclosure. Furthermore, while the example shown here is represented in three spatial dimensions, the same structure may also be obtained from other implementations of codes that are not based on a purely spatial entangled cluster state, but rather can include both entanglement in 2D space and entanglement in time, e.g., a 2+1D surface code implementation can be used or any other foliated code. For cluster state implementation of such codes, all of the quantum gates needed for fault tolerant quantum computation can be constructed by making a series of single particle measurements to the physical qubits that make up the lattice.

Returning to FIG. 1A, a chunk of a Raussendorf lattice is shown. Such an entangled state can be used to encode one or more logical qubits (i.e., one or more error corrected qubits) using many entangled physical qubits. The collection of single particle measurement results of the multiple physical qubits (e.g., physical qubit 116) can be used for correcting errors and for performing fault tolerant computations on the logical qubits through the use of a decoder. Many decoders are available with one example being the Union-Find decoder as described in International Patent Application Publication No. WO2019/002934A1, the disclosure of which is hereby incorporated by reference in its entirety for all purposes. One of ordinary skill will appreciate that the number of physical qubits required to encode a single logical qubit can vary depending on the precise nature of the physical errors, noise, etc., that are experienced by the physical qubits, but to achieve fault tolerance, all proposals to date require entangled states of thousands of physical qubits to encode a single logical qubit. Generating and maintaining such a large entangled state remains a key challenge for any practical implementation of the MBQC approach.

Figure 1B:
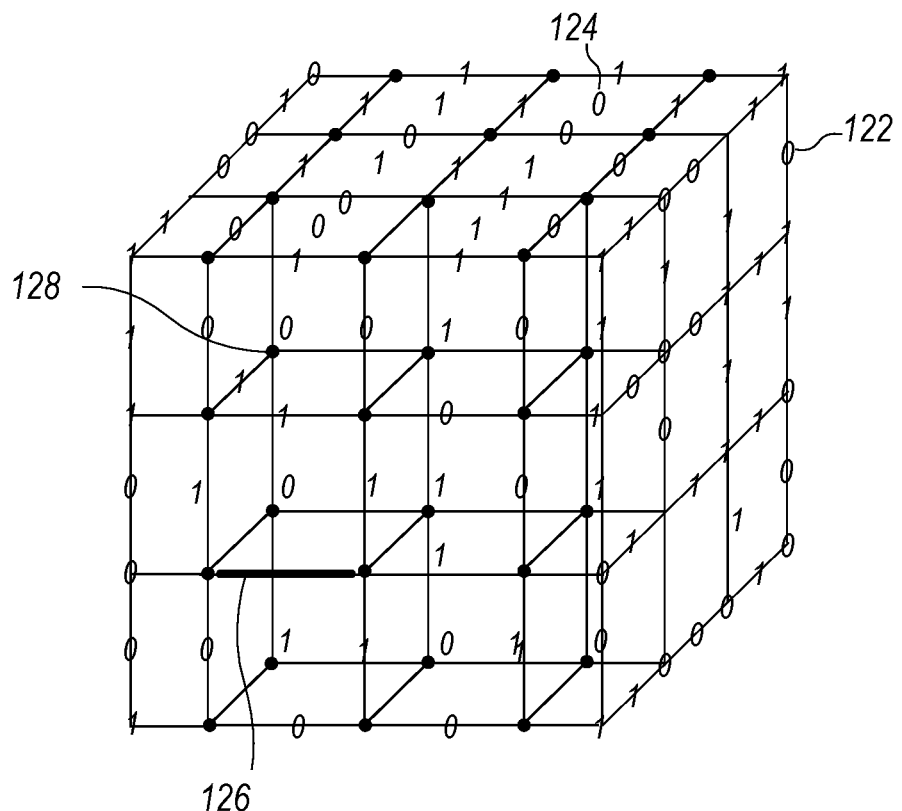
Figure 1C:
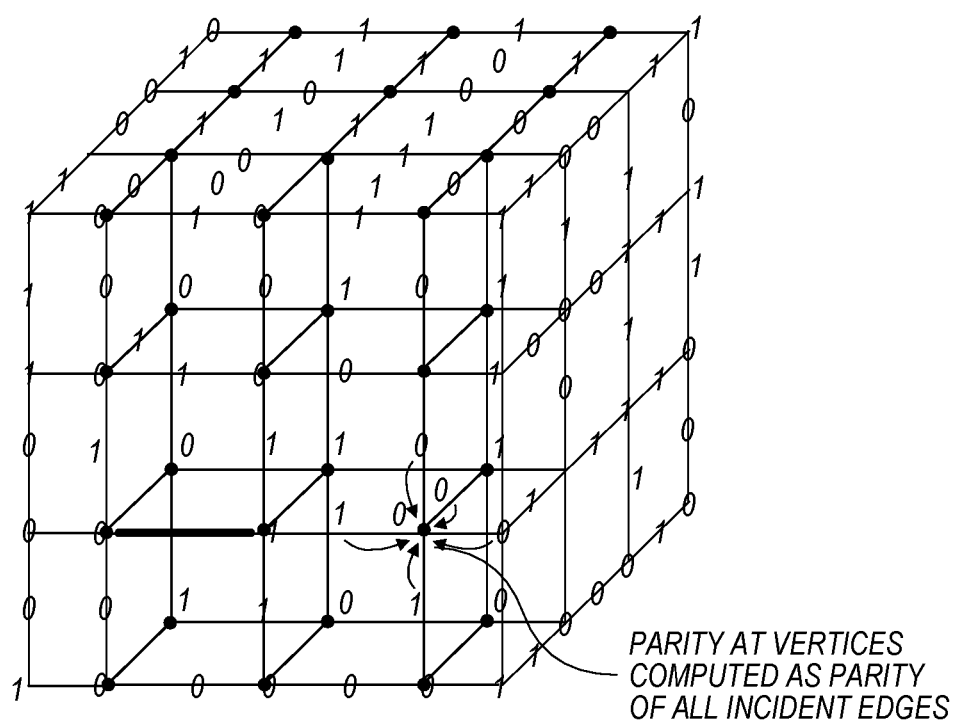

FIGS. 1B-1C illustrate how the decoding of a logical qubit can proceed for a cluster state based on the Raussendorf lattice. As can be seen in FIG. 1A, the geometry of the cluster state is related to the geometry of a cubic lattice (lattice cell 120) shown superimposed on the clusters state in FIG. 1A. FIG. 1B shows the single particle measurement results (also superimposed on the cubic lattice) after the state of each physical qubit of the cluster state has been measured, with the measurement results being placed in the former position of the physical qubit that was measured (for clarity only measurement results that result from measurements of the surface qubits are shown).

In some embodiments, a measured qubit state can be represented by a numerical bit value of either 1 or 0 after all qubits have been measured, e.g., in the x basis, with the 1 bit value corresponding to the +x measurement outcome and the 0 but value corresponding to −x measurement outcomes (or vice versa). There are two types of qubits, those that are located on the edges of a unit cell (e.g. at edge qubit 122), and those that are located on the faces of a unit cell (e.g., face qubit 124). In some cases, a measurement of the qubit may not be obtained, or the result of the qubit measurement may be invalid. In these cases, there is no bit value assigned to the location of the corresponding measured qubit, but instead the outcome is referred to herein as an erasure, illustrated here as thick line 126, for example. These measurement outcomes that are known to be missing can be reconstructed during the decoding procedure.

To identify errors in the physical qubits, a syndrome graph can be generated from the collection of measurement outcomes resulting from the measurements of the physical qubits. For example, the bit values associated with each edge qubit can be combined to create a syndrome value associated with the vertex the results from the intersection of the respective edges, e.g., vertex 128 as shown in FIG. 1B. A set of syndrome values, also referred to herein as parity checks, are associated with each vertex of the syndrome graph, as shown in FIG. 1C. More specifically, in FIG. 1C, the computed values of some of the vertex parity checks of the syndrome graph are shown. In some embodiments, a parity computation entails determining whether the sum of the edge values incident on a given vertex is an even or odd integer, with the parity result for that vertex being defined to be the result of the sum mod 2. If no errors occurred in the quantum state, or in the qubit measurement then all syndrome values should be even (or 0). On the contrary, if an error occurs, it will result in some odd (or 1) syndrome values. Only half of the bit values from qubit measurement are associated with the syndrome graph shown (the bits aligned with the edges of the syndrome graph). There is another syndrome graph that contains all the bit values associated with the faces of the lattice shown. This leads to an equivalent decoding problem on these bits.

As mentioned above, the generation and subsequent storage of large cluster states of qubits can be a challenge. However, some embodiments, methods and systems described herein provide for the generation of a set of classical measurement data (e.g., a set of classical data corresponding to syndrome graph values of a syndrome graph) that includes the necessary correlations for performing quantum error correction, without the need to first generate a large entangled state of qubits in an error correcting code. For example, embodiments disclosed herein described systems and methods whereby two-qubit (i.e., joint) measurements, also referred to herein as "fusion measurements" or "fusion gates" can be performed on a collection of much smaller entangled states to generate a set of classical data that includes the long-range correlations necessary to generate and decode the syndrome graph for a particular chosen cluster state, without the need to actually generate the cluster state. In other words, in some systems and methods described herein, there is only ever generated a collection of relatively small entangled states (referred to herein as resource states) and then joint measurements are performed on these resource states directly to generate the syndrome graph data without the need to first generate (and then measure) a large cluster state that forms a quantum error correcting code (e.g., a topological code such as the Raussendorf lattice).

For example, as will be described in further detail below, in the case of linear optical quantum computing using a Raussendorf lattice code structure, to generate the syndrome graph data, a fusion gate can be applied to a collection of small entangled states (e.g., 4-GHZ states, where "GHZ" refers to a Greenberger-Horne-Zeilinger state, and 4 denotes the number of qubits) that are themselves not entangled with each other and thus are never part of a larger Raussendorf lattice cluster state. Despite the fact that qubits from the individual resource states were not mutually entangled prior to the fusion measurement, the measurement outcomes that result from the fusion measurements generate a syndrome graph that includes all the necessary correlations to perform quantum error correction. Such systems and methods are referred to herein as Fusion Based Quantum Computing (FBQC). Advantageously, the resource states have a size that is independent of the computation being performed or code distance used, which is in stark contrast to the cluster states of MBQC. This allows the resource states used for FBQC to be generated by a constant number of sequential operations. As a result, in FBQC, errors in the resource state are bounded, which is important for fault-tolerance.

2. A System for FBQC

Figure 2:
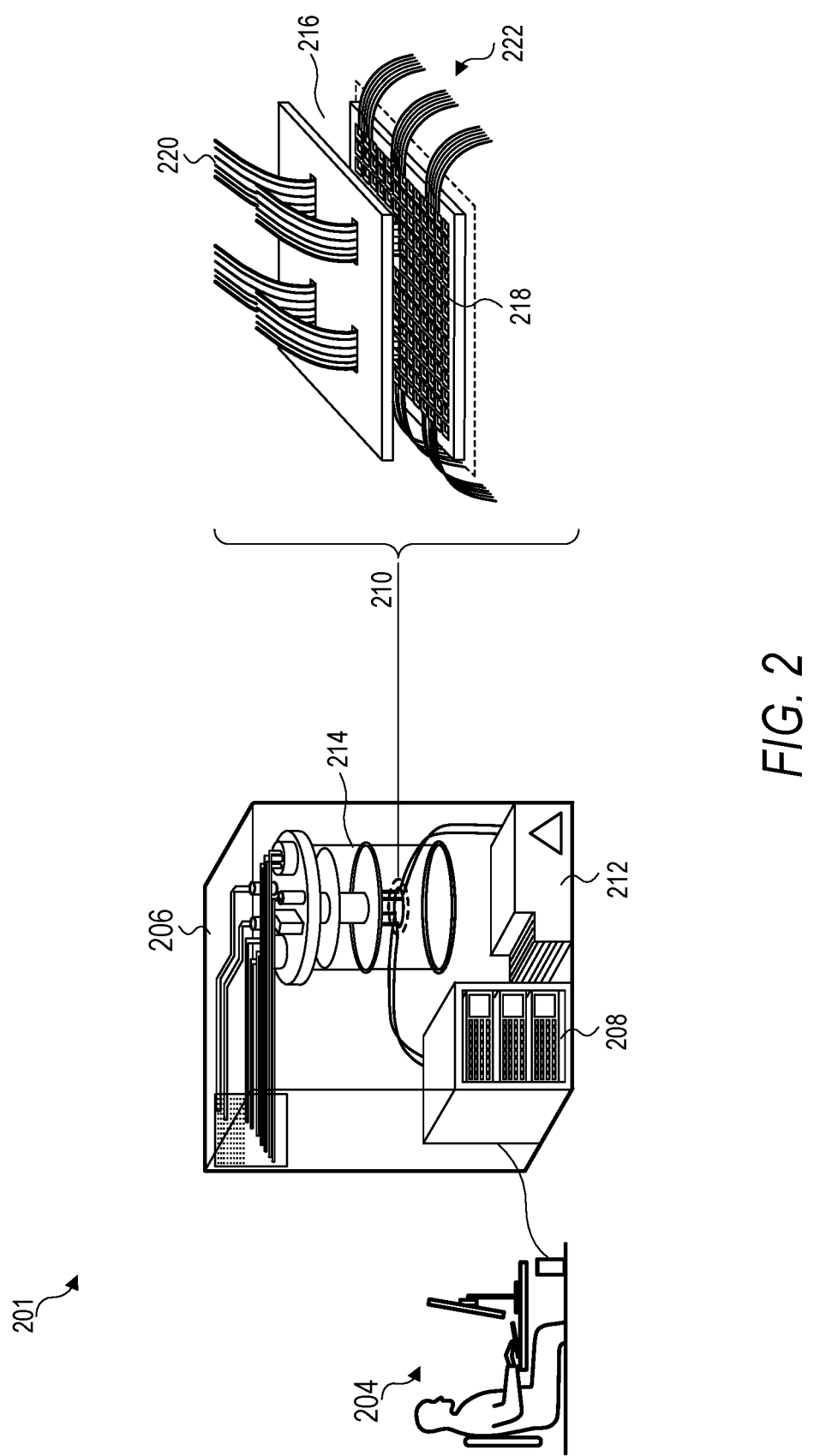
FIG. 2 shows a quantum computing system in accordance with one or more embodiments.

FIG. 2 shows a quantum computing system in accordance with one or more embodiments. The quantum computing system 201 includes a user interface device 204 that is communicatively coupled to a quantum computing (QC) sub-system 206, described in more detail below in FIG. 3. The user interface device 204 can be any type of user interface device, e.g., a terminal including a display, keyboard, mouse, touchscreen and the like. In addition, the user interface device can itself be a computer such as a personal computer (PC), laptop, tablet computer and the like. In some embodiments, the user interface device 204 provides an interface with which a user can interact with the QC subsystem 206 directly or via a local area network, wide area network, or via the internet. For example, the user interface device 204 may run software, such as a text editor, an interactive development environment (IDE), command prompt, graphical user interface, and the like so that a user can program, or otherwise interact with, the QC subsystem to run one or more quantum algorithms. In other embodiments, the QC subsystem 206 may be pre-programmed and the user interface device 204 may simply be an interface where a user can initiate a quantum computation, monitor the progress, and receive results from the QC subsystem 206. QC subsystem 206 can further include a classical computing system 208 coupled to one or more quantum computing chips 210. In some examples, the classical computing system 208 and the quantum computing chip 210 can be coupled to other electronic components 212, e.g., pulsed pump lasers, microwave oscillators, power supplies, networking hardware, etc. In some embodiments that require cryogenic operation, the quantum computing system 201 can be housed within a cryostat, e.g., cryostat 214. In some embodiments, the quantum computing chip 210 can include one or more constituent chips, e.g., an integration (direct or heterogeneous) of electronic chip 216 and integrated photonics chip 218. Signals can be routed on- and off-chip any number of ways, e.g., via optical interconnects 220 and via other electronic interconnects 222. In addition, the computing system 201 may employ a quantum computing process, e.g., a fusion-based quantum computing process as described in further detail below.

Figure 3:
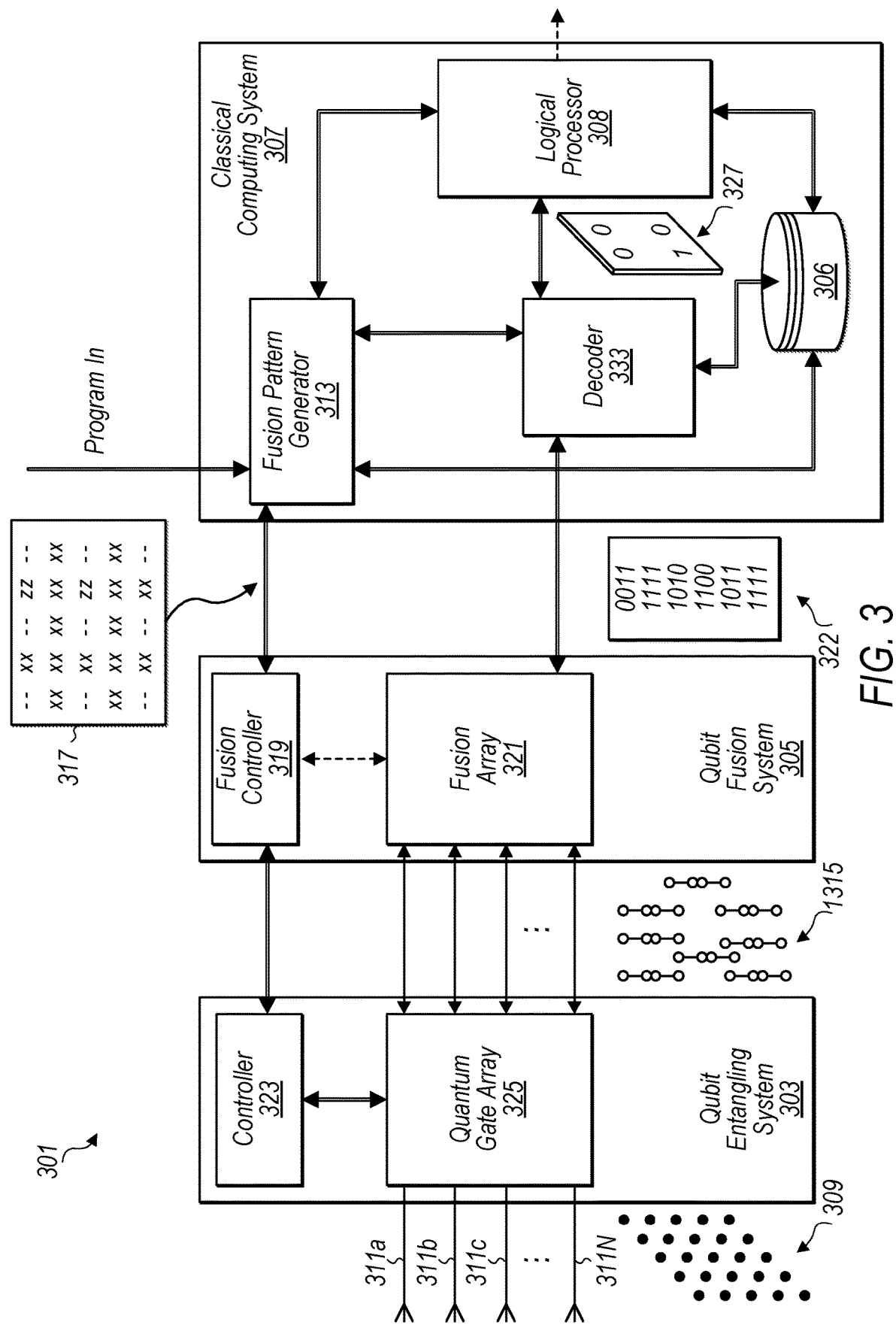
FIG. 3 shows a quantum computing system in accordance with some embodiments.

FIG. 3 shows a block diagram of a QC system 301 in accordance with some embodiments. Such a system can be associated with the computing system 201 introduced above in reference to FIG. 2. In FIG. 3, solid lines represent quantum information channels and double-solid lines represent classical information channels. The QC system 301 includes a qubit entangling system 303, qubit fusion system 305, and classical computing system 307. In some embodiments, the qubit entangling system 303 can take as input a collection of N physical qubits (also referred to herein as "quantum sub-systems"), e.g., physical qubits 309 (also represented schematically as inputs 311a, 311b, 311c, ..., 311N) and can generate quantum entanglement between two or more of them to generate entangled resource states 315 (also referred to herein as "quantum systems" which are themselves made up of entangled states of quantum sub-systems). For example, in the case of photonic qubits, the qubit entangling system 303 can be a linear optical system such as an integrated photonic circuit that includes waveguides, beam splitters, photon detectors, delay lines, and the like. In some examples, the entangled resource states 315 can be relatively small entangled states of qubits (e.g., qubit entangled states having between 3 and 30 qubits). In some embodiments, the resource states can be chosen such that the fusion operations applied to certain qubits of these states results in syndrome graph data that includes the required correlations for quantum error correction. Advantageously, the system shown in FIG. 3 provides for fault tolerant quantum computation using relatively small resource states, without requiring that the resource states become mutually entangled with each other to form the typical lattice cluster state required for MBQC.

In some embodiments, the input qubits 309 can be a collection of quantum systems (also referred to herein as quantum-subsystems) and/or particles and can be formed using any qubit architecture. For example, the quantum systems can be particles such as atoms, ions, nuclei, and/or photons. In other examples, the quantum systems can be other engineered quantum systems such as flux qubits, phase qubits, or charge qubits (e.g., formed from a superconducting Josephson junction), topological qubits (e.g., majorana fermions), spin qubits formed from vacancy centers (e.g., nitrogen vacancies in diamond), or qubits otherwise encoded in multiple quantum systems, e.g., Gottesman-Kitaev-Preskill (GKP) encoded qubits and the like. Furthermore, for the sake of clarity of description, the term "qubit" is used herein although the system can also employ quantum information carriers that encode information in a manner that is not necessarily associated with a binary bit. For example, qudits (i.e., quantum systems that can encode information in more than two quantum states) can be used in accordance with some embodiments.

In accordance with some embodiments, the QC system 301 can be a fusion-based quantum computer that can run one or more quantum algorithms or software programs. For example, a software program (e.g., a set of machine-readable instructions) that represents the quantum algorithm to be run on the QC system 301 can be passed to a classical computing system 307 (e.g., corresponding to system 208 in FIG. 2 above). The classical computing system 307 can be any type of computing device such as a PC, one or more blade servers, and the like, or even a high-performance computing system such as a supercomputer, server farm, and the like. Such a system can include one or more processors (not shown) coupled to one or more computer memories, e.g., memory 306. Such a computing system will be referred to herein as a "classical computer." In some examples, the software program can be received by a classical computing module, referred to herein as a fusion pattern generator 313. One function of the fusion pattern generator 313 is to generate a set of machine-level instructions from the input software program (which may originate as high-level code that can be more easily written by a user to program the quantum computer).

In some embodiments, the fusion pattern generator 313 can operate as a compiler for software programs to be run on the quantum computer. Fusion pattern generator 313 can be implemented as pure hardware, pure software, or any combination of one or more hardware or software components or modules. In various embodiments, fusion pattern generator 313 can operate at runtime or in advance; in either case, machine-level instructions generated by fusion pattern generator 313 can be stored (e.g., in memory 306). In some examples, the compiled machine-level instructions take the form of one or more data frames that instruct the qubit fusion system 305 to make, at a given clock cycle of the quantum computer, one or more fusions between certain qubits from the separate, i.e., unentangled, resource states 315. For example, fusion pattern data frame 317 is one example of the set of fusion measurements (e.g., Type II fusion measurements, described in more detail below in reference to FIGS. 18-21) that should be applied between certain pairs of qubits from different entangled resource states 315 during a certain clock cycle as the program is executed. In some embodiments, several fusion pattern data frames 317 can be stored in memory 306 as classical data. In some embodiments, the fusion pattern data frames 317 can dictate whether or not XX Type II Fusion is to be applied (or whether any other type of fusion, or not, is to be applied) for a particular fusion gate within the fusion array 321 of the qubit fusion system 305. In addition, the fusion pattern data frames 317 can indicate that the Type II fusion is to be performed in a different basis, e.g., XX, XY, ZZ, etc. As used herein, the term XX Type II Fusion, YY Type II Fusion, XY Type II Fusion, ZZ Type II Fusion etc. refer to a fusion operation that applies a particular a two-particle projective measurement, e.g., a Bell projection which, depending on the Bell basis chosen, can project the two qubits onto one of the 4. Bell states. Such projective measurements produce two measurement outcomes that correspond to the eigenvalues of the corresponding pair of observables that are measured in the chosen basis. For example, XX Fusion is a Bell projection that measures the XX and ZZ observables (each of which could have a +1 or −1 eigenvalue—or 0 or 1 depending on the convention used), and XZ Fusions is a Bell projection that measures the observable XZ and ZX observables, and the like. FIGS. 18-21 below show example circuits for performing Type II fusions for various choices of basis in a linear optical system but other Bell projective measurements are possible in other qubit architectures without departing from the scope of the present disclosure. One of ordinary skill will appreciate that in a linear optical system, Type II Fusions perform probabilistic Bell measurements. FIGS. 18-21 discuss the probabilistic nature of linear optical fusion in the context of fusion "success" and "failure" outcomes and will not be repeated here for the sake of clarity.

A fusion controller circuit 319 of the qubit fusion system 305 can receive data that encodes the fusion pattern data frames 317 and, based on this data, can generate configuration signals, e.g., analog and/or digital electronic signals, that drive the hardware within the fusion array 321. For example, for the case of photonic qubits, the fusion gates can include photon detectors coupled to one or more waveguides, beam splitters, interferometers, switches, polarizers, polarization rotators and the like. More generally, the detectors can be any detector that can detect the quantum states of one or more of the qubits in the resource states 315. One of ordinary skill will appreciate that many types of detectors may be used depending on the particular qubit architecture being employed.

In some embodiments, the result of applying the fusion pattern data frames 317 to the fusion array 321 is the generation of classical data (generated by the fusion gates' detectors) that is read out, and optionally pre-processed, and sent to decoder 333. More specifically, the fusion array 321 can include a collection of measuring devices that implement the joint measurements between certain qubits from two different resource states and generate a collection of measurement outcomes associated with the joint measurement. These measurement outcomes can be stored in a measurement outcome data frame, e.g., data frame 322 and passed back to the classical computing system for further processing.

In some embodiments, any of the submodules in the QC system 301, e.g., controller 323, quantum gate array 325, fusion array 321, fusion controller 319, fusion pattern generator 313, decoder 323, and logical processor 308 can include any number of classical computing components such as processors (CPUs, GPUs, TPUs) memory (any form of RAM, ROM), hard coded logic components (classical logic gates such as AND, OR, XOR, etc.) and/or programmable logic components such as field programmable gate arrays (FPGAs and the like). These modules can also include any number of application specific integrated circuits (ASICs), microcontrollers (MCUs), systems on a chip (SOCs), and other similar microelectronics.

In some embodiments, the entangled resource states 315 can be any type of entangled resource state, that, when the fusion operations are performed, produces measurement outcome data frames that include the necessary correlations for performing fault tolerant quantum computation. While FIG. 3 shows an example of a collection of identical resource states, a system can be employed that generates many different types of resource states and can even dynamically change the type of resource state being generated based on the demands of the quantum algorithm being run. As described herein, the logical qubit measurement outcomes 327 can be fault tolerantly recovered, e.g., via decoder 333, from the measurement outcomes 322 of the physical qubits. Logical processor 308 can then process the logical outcomes as part of the running of the program. As shown, the logical processor can feed back information to the fusion pattern generator 313 for affect downstream gates and/or measurements to ensure that the computation proceeds fault tolerantly.

Figure 4:
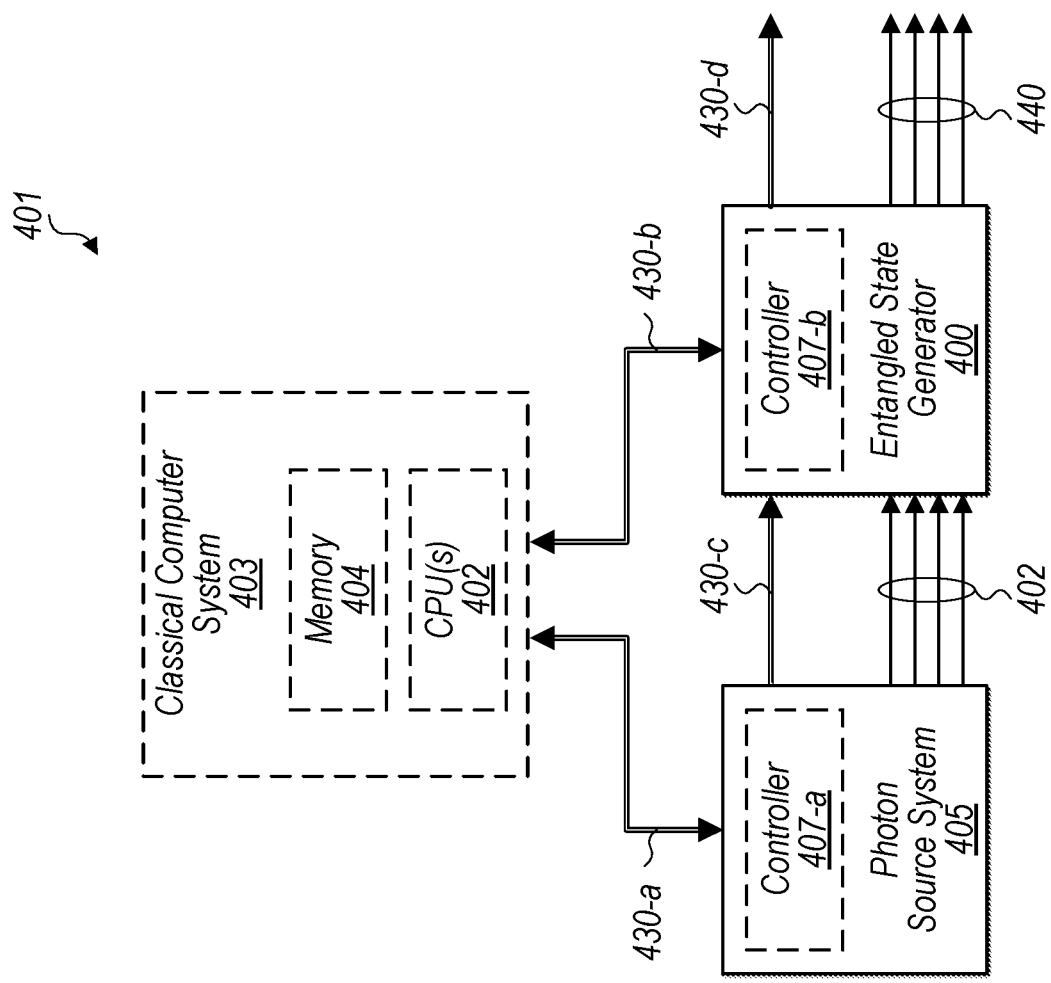
FIG. 4 illustrates an example of a qubit entangling system in accordance with some embodiments.

FIG. 4 illustrates an example of a qubit entangling system 401 in accordance with some embodiments. Such a system can be used to generate qubits (e.g., photons) in an entangled state (e.g., the resource state used in the illustrative examples shown in FIGS. 7-9 below), in accordance with some embodiments. Qubit entangling system 401 is an example of a system that can be employed in an FBQC system, such as qubit entangling system 303 shown in FIG. 3 above. One of ordinary skill will appreciate that any qubit entangling system could be used without departing from the scope of the present disclosure. Examples of qubit entangling systems can be found in U.S. patent application Ser. No. 16/621,994 (published as US Pat App Pub No 20200287631) titled, Generation of entangled qubit states, U.S. patent application Ser. No. 16/691,459 now U.S. Pat. No. 11,126,062), titled, GENERATION OF ENTANGLED PHOTONIC STATES, and U.S. patent application Ser. No. 16/691,450 (published as U.S. Pat. No. 11,501,198), titled, GENERATION OF AN ENTANGLED PHOTONIC STATE FROM PRIMITIVE RESOURCES, the disclosures of which are hereby incorporated by reference in their entireties for all purposes. For example, in some embodiments, rather than generating single photons, the photon sources may generate entangled resource states directly, or may even generate smaller entangled states that can undergo additional entangling operations at the Entangled State Generator 400 to produce the final resource states to be used for FBQC. As such, as used herein the scope of the term "photon source" is intended to include at least sources of single photons, sources of multiple photons in entangled states, or more generally any source of photonic states. One of ordinary skill will appreciate that the precise form of the resource state generation hardware is not critical and any system can be employed without departing from the scope of the present disclosure.

In an illustrative photonic architecture, qubit entangling system 401 can include a photon source system 405 that is optically connected to entangled state generator 400. Both the photon source system 405 and the entangled state generator 400 may be coupled to a classical processing system 403 such that the classical processing system 403 can communicate with and/or control (e.g., via the classical information channels 430a-b) the photon source system 405 and/or the entangled state generator 400. Photon source system 405 may include a collection of single-photon sources that can provide output photonic states (e.g., single photons or other photonic states such as Bell states, GHZ states, and the like) to entangled state generator 400 by way of interconnecting waveguides 402. Entangled state generator 400 may receive the output photonic states and convert them to one or more entangled photonic states (or larger photonic states in the case that the source itself outputs an entangled photonic state) and then output these entangled photonic states into output waveguides 440. In some embodiments, output waveguides 440 can be coupled to some downstream circuit that may use the entangled states for performing a quantum computation. For example, the entangled states generated by the entangled state generator 400 may be used as resources for a downstream quantum optical circuit (not shown).

In some embodiments, the photon source system 405 and the entangled state generator 400 may be used in conjunction with the quantum computing system illustrated in FIG. 3. For example, the qubit entangling system 303 illustrated in FIG. 3 may include the photon source system 405 and the entangled state generator 400, and the classical computer system 403 of FIG. 4 may include one or more of the various classical computing components illustrated in FIG. 3 (e.g., the classical computing system 307). In this case, the entangled photons that leave via output waveguides 440 can be fused together by the qubit fusion system 305, i.e., they can be input to a detection system that performs a collection of joint measurements for use in a FBQC scheme.

In some embodiments, system 401 may include classical channels 430 (e.g., classical channels 430-a through 430-d) for interconnecting and providing classical information between components. It should be noted that classical channels 430-a through 430-d need not all be the same. For example, classical channel 430-a through 430-c may comprise a bi-directional communication bus carrying one or more reference signals, e.g., one or more clock signals, one or more control signals, or any other signal that carries classical information, e.g., heralding signals, photon detector readout signals, and the like.

In some embodiments, qubit entangling system 401 includes the classical computer system 403 that communicates with and/or controls the photon source system 405 and/or the entangled state generator 400. For example, in some embodiments, classical computer system 403 can be used to configure one or more circuits, e.g., using a system clock that may be provided to photon sources 405 and entangled state generator 400 as well as any downstream quantum photonic circuits used for performing quantum computation. In some embodiments, the quantum photonic circuits can include optical circuits, electrical circuits, or any other types of circuits. In some embodiments, classical computer system 403 includes memory 404, one or more processor(s) 402, a power supply, an input/output (I/O) subsystem, and a communication bus or interconnecting these components. The processor(s) 402 may execute software modules, programs, and/or instructions stored in memory 404 and thereby perform processing operations.

In some embodiments, memory 404 stores one or more programs (e.g., sets of instructions) and/or data structures. For example, in some embodiments, entangled state generator 400 can attempt to produce an entangled state over successive stages and/or over independent instances, any one of which may be successful in producing an entangled state. In some embodiments, memory 404 stores one or more programs for determining whether a respective stage was successful and configuring the entangled state generator 400 accordingly (e.g., by configuring entangled state generator 400 to switch the photons to an output if the stage was successful, or pass the photons to the next stage of the entangled state generator 400 if the stage was not yet successful). To that end, in some embodiments, memory 404 stores detection patterns from which the classical computing system 403 may determine whether a stage was successful. In addition, memory 404 can store settings that are provided to the various configurable components (e.g., switches) described herein that are configured by, e.g., setting one or more phase shifts for the component.

In some embodiments, some or all of the above-described functions may be implemented with hardware circuits on photon source system 405 and/or entangled state generator 400. For example, in some embodiments, photon source system 405 includes one or more controllers 407-a (e.g., logic controllers) (e.g., which may comprise field programmable gate arrays (FPGAs), application specific integrated circuits (ASICS), a "system on a chip" that includes classical processors and memory, or the like). In some embodiments, controller 407-a determines whether photon source system 405 was successful (e.g., for a given attempt on a given clock cycle) and outputs a reference signal indicating whether photon source system 405 was successful. For example, in some embodiments, controller 407-a outputs a logical high value to classical channel 430-a and/or classical channel 430-c when photon source system 405 is successful and outputs a logical low value to classical channel 430-a and/or classical channel 430-c when photon source system 405 is not successful. In some embodiments, the output of control 407-a may be used to configure hardware in controller 107-b.

Similarly, in some embodiments, entangled state generator 400 includes one or more controllers 407-b (e.g., logical controllers) (e.g., which may comprise field programmable gate arrays (FPGAs), application specific integrated circuits (ASICS), or the like) that determine whether a respective stage of entangled state generator 400 has succeeded, perform the switching logic described above, and output a reference signal to classical channels 430-b and/or 430-d to inform other components as to whether the entangled state generator 400 has succeeded.

In some embodiments, a system clock signal can be provided to photon source system 405 and entangled state generator 400 via an external source (not shown) or by classical computing system 403 via classical channels 430-a and/or 430-b. Examples of clock generators that may be used are described in U.S. Pat. No. 10,379,420, the contents of which is hereby incorporated by reference in its entirety for all purposes; but other clock generators may also be used without departing from the scope of the present disclosure. In some embodiments, the system clock signal provided to photon source system 405 triggers photon source system 405 to attempt to output one photon per waveguide. In some embodiments, the system clock signal provided to entangled state generator 400 triggers, or gates, sets of detectors in entangled state generator 400 to attempt to detect photons. For example, in some embodiments, triggering a set of detectors in entangled state generator 400 to attempt to detect photons includes gating the set of detectors.

It should be noted that, in some embodiments, photon source system 405 and entangled state generator 400 may have internal clocks. For example, photon source system 405 may have an internal clock generated and/or used by controller 407-a and entangled state generator 400 has an internal clock generated and/or used by controller 407-b. In some embodiments, the internal clock of photon source system 405 and/or entangled state generator 400 is synchronized to an external clock (e.g., the system clock provided by classical computer system 403) (e.g., through a phase-locked loop). In some embodiments, any of the internal clocks may themselves be used as the system clock, e.g., an internal clock of the photon source may be distributed to other components in the system and used as the master/system clock.

In some embodiments, photon source system 405 includes a plurality of probabilistic photon sources that may be spatially and/or temporally multiplexed, i.e., a so-called multiplexed single photon source. In one example of such a source, the source is driven by a pump, e.g., a light pulse, that is coupled into an optical resonator that, through some nonlinear process (e.g., spontaneous four wave mixing, second harmonic generation, and the like) may generate zero, one, or more photons. As used herein, the term "attempt" is used to refer to the act of driving a photon source with some sort of driving signal, e.g., a pump pulse, that may produce output photons non-deterministically (i.e., in response to the driving signal, the probability that the photon source will generate one or more photons may be less than 1). In some embodiments, a respective photon source may be most likely to, on a respective attempt, produce zero photons (e.g., there may be a 90% probability of producing zero photons per attempt to produce a single-photon). The second most likely result for an attempt may be production of a single-photon (e.g., there may be a 9% probability of producing a single-photon per attempt to produce a single-photon). The third most likely result for an attempt may be production of two photons (e.g., there may be an approximately 1% probability of producing two photons per attempt to produce a single photon). In some circumstances, there may be less than a 1% probability of producing more than two photons.

In some embodiments, the apparent efficiency of the photon sources may be increased by using a plurality of single-photon sources and multiplexing the outputs of the plurality of photon sources. In some embodiments, the photon source can also produce a classical herald signal that announces (or heralds) the success of the generation. In some embodiments, this classical signal is obtained from the output of a detector, where the photon source system always produces photon states in pairs (such as in SPDC), and detection of one photon signal is used to herald the success of the process. This herald signal can be provided to a multiplexer and used to properly route a successful generation to a multiplexer output port, as described in more detail below.

The precise type of photon source used is not critical and any type of source can be used, employing any photon generating process, such as spontaneous four wave mixing (SPFW), spontaneous parametric down-conversion (SPDC), or any other process. Other classes of sources that do not necessarily require a nonlinear material can also be employed, such as those that employ atomic and/or artificial atomic systems, e.g., quantum dot sources, color centers in crystals, and the like. In some cases, sources may or may be coupled to photonic cavities, e.g., as can be the case for artificial atomic systems such as quantum dots coupled to cavities. Other types of photon sources also exist for SPWM and SPDC, such as optomechanical systems and the like. In some examples the photon sources can emit multiple photons already in an entangled state in which case the entangled state generator 400 may not be necessary, or alternatively may take the entangled states as input and generate even larger entangled states.

In some embodiments, spatial multiplexing of several non-deterministic photon sources (also referred to as a MUX photon source) can be employed. Many different spatial MUX architectures are possible without departing from the scope of the present disclosure. Temporal MUXing can also be implemented instead of or in combination with spatial multiplexing. MUX schemes that employ log-tree, generalized Mach-Zehnder interferometers, multimode interferometers, chained sources, chained sources with dump-the-pump schemes, asymmetric multi-crystal single photon sources, or any other type of MUX architecture can be used. In some embodiments, the photon source can employ a MUX scheme with quantum feedback control and the like. One example of an nxm MUXed source is disclosed in U.S. Pat. No. 10,677,985, the contents of which is hereby incorporated by reference in its entirety for all purposes.

Figure 5:
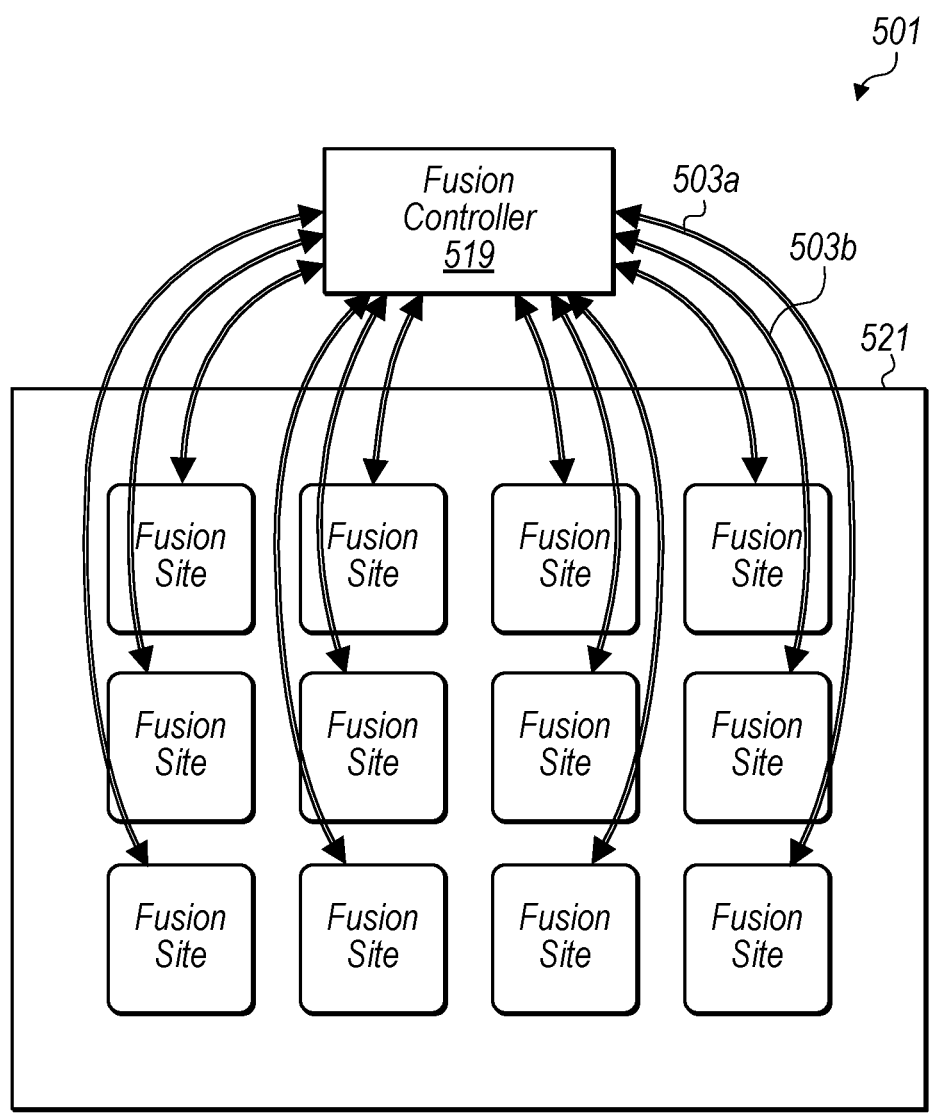
FIG. 5 shows one example of qubit fusion system in accordance with some embodiments.

FIG. 5 shows one example of qubit fusion system 501 in accordance with some embodiments. In some embodiments, qubit fusion system 501 can be employed within a larger FBQC system such as qubit fusion system 305 shown in FIG. 3.

Qubit fusion system 501 includes a fusion controller 519 that is coupled to fusion array 521. Fusion controller 519 is configured to operate as described above in reference to fusion controller circuit 319 of FIG. 3 above. Fusion array 521 includes a collection of fusion sites that each receive two or more qubits from different resource states (not shown) and perform one or more fusion operations (e.g., Type II fusion) on selected qubits from the two or more resource states. The fusion operations performed on the qubits can be controlled by the fusion controller 519 via classical signals that are sent from the fusion controller 519 to each of the fusion sites via control channels 503a, 503b, etc. Based on the joint measurements performed at each fusion site, classical measurement outcomes in the form of classical data are output and then provided to a decoder system, as shown and described above in reference to FIG. 3. Examples of photonic circuits that can be employed as Type II fusion gates are described in below in reference to FIG. 6 and also FIGS. 18-20.

Figure 6:
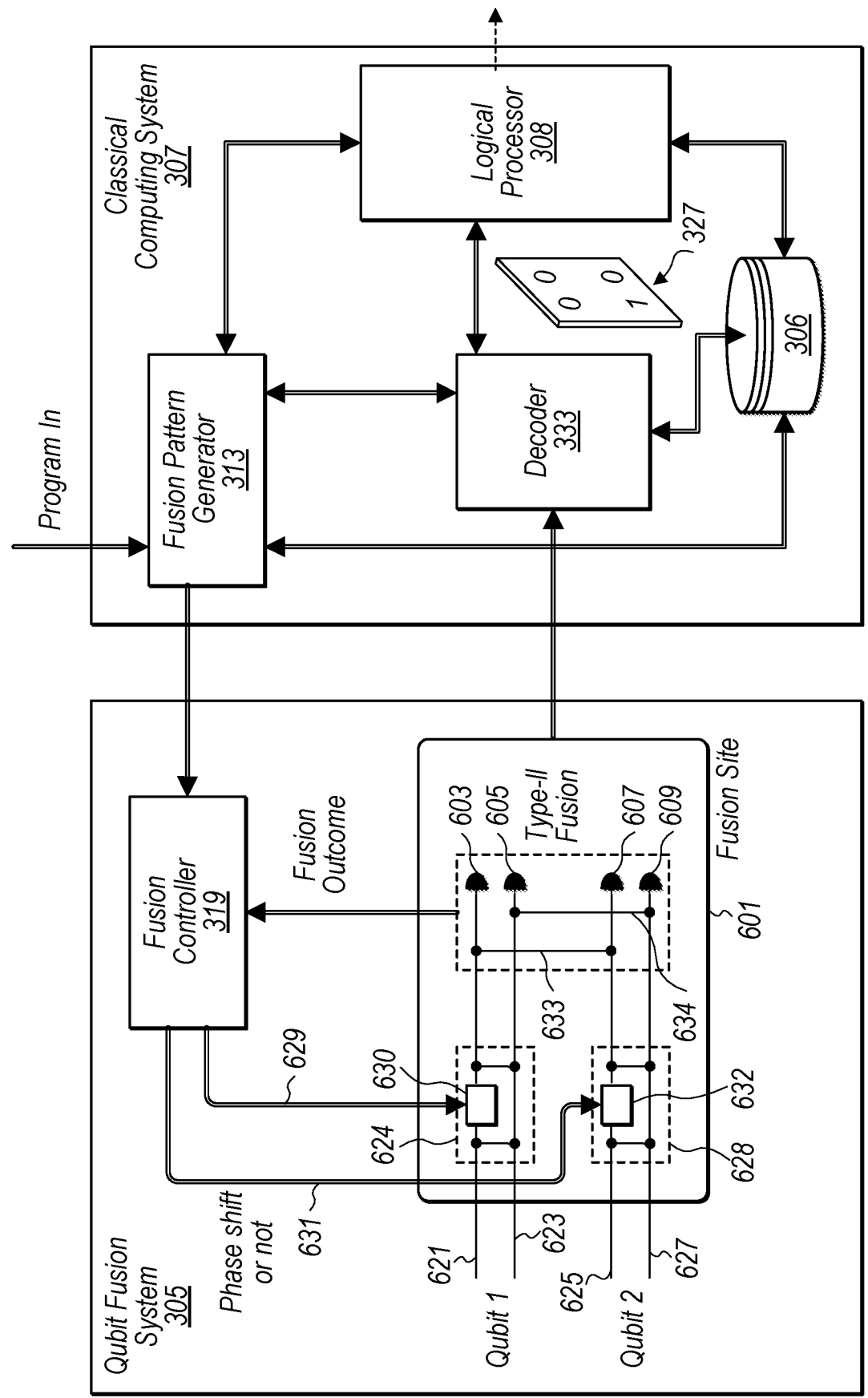
FIG. 6 shows one possible example of a fusion site as configured to operate with a fusion controller to provide measurement outcomes to a decoder for fault tolerant quantum computation in accordance with some embodiments.

FIG. 6 shows one possible example of a fusion site 601 as configured to operate with a fusion controller 319 to provide measurement outcomes to a decoder for fault tolerant quantum computation in accordance with some embodiments. In this example, fusion site 601 can be an element of fusion array 321 (shown in FIG. 3), and although only one instance is shown for purposes of illustration, fusion array 321 can include any number of instances of fusion sites 601.

As described above, the qubit fusion system 305 can receive two or more qubits (Qubit 1 and Qubit 2, shown here in a dual rail encoding) that are to be fused. Qubit 1 is one qubit that is entangled with one or more other qubits (not shown) as part of a first resource state and Qubit 2 is another qubit that is entangled with one or more other qubits (not shown) as part of a second resource state. Advantageously, in contrast to MBQC, none of the qubits from the first resource state need be entangled with any of the qubits from the second (or any other) resource state in order to facilitate a fault tolerant quantum computation. Also advantageously, at the inputs of a fusion site 601, the collection of resource states are not mutually entangled to form a cluster state that takes the form of a quantum error correcting code and thus there is no need to store and or maintain a large cluster state with long-range entanglement across the entire cluster state. Also advantageously, the fusion operations that take place at the fusion sites can be fully destructive joint measurements on Qubit 1 and Qubit 2 such that all that is left after the measurement is classical information representing the measurement outcomes on the detectors, e.g., detectors 603, 605, 607, 609. At this point, the classical information is all that is needed for the decoder 333 to perform quantum error correction, and no further quantum information is propagated through the system. This can be contrasted with an MBQC system that might employ fusion sites to fuse resource states into a cluster state that itself serves as the topological code and only then generates the required classical information via single particle measurements on each qubit in the large cluster state. In such an MBQC system, not only does the large cluster state need to be stored and maintained in the system before the single particle measurements are made, but an extra single particle measurement step needs to be applied (in addition to the fusions used to generate the cluster state) to every qubit of the cluster state in order to generate the classical information required to compute the syndrome graph data required for the decoder to perform quantum error correction.

FIG. 6 shows an illustrative example for one way to implement a fusion site as part of a photonic quantum computer architecture. In this example, qubit 1 and qubit 2 can be dual rail encoded photonic qubits. A brief introduction to the dual-rail encoding of photonic qubits is provided in Section 4 below, in reference to FIGS. 11-14. Accordingly, qubit 1 and qubit 2 can input on waveguides pair 621, 623 and on waveguide pair 625, 627, respectively. Interferometers 624 and 628 can be placed in line with each qubit, and within one arm of each interferometer 624, 628 a programmable phase shifter 630, 632 can be optionally applied to affect the basis in which the fusion operation is applied, e.g., by implementing the specific mode couplings shown in FIG. 21 to implement what is referred to herein as XX, XY, YY, or ZZ fusions). The programmable phase shifters 630, 632 can be coupled to the fusion controller 319 via control line 629 and 631 such that signals from the fusion controller 319 can be used to set the basis in which the fusion operation is applied to the qubits. In some embodiments the basis can be hard-coded within the fusion controller 319, or in some embodiments the basis can be chosen based upon external inputs, e.g., instructions provided by the fusion pattern generator 313. Additional mode couplers, e.g., mode couplers 633 and 632 can be applied after the interferometers followed by single photon detectors 603, 605, 607, 609 to provide a readout mechanism for performing the joint measurement.

In some embodiments, fusion can be probabilistic operation, i.e., it implements a probabilistic Bell measurement, with the measurement sometimes succeeding and sometime failing, as described in FIG. 20 below. In some embodiments, the success probability of such operation can be increased by using extra quantum systems in addition to those onto which the operation is acting upon. Embodiments using extra quantum systems are usually referred to as "boosted" fusion. In the example shown in FIG. 6, the fusion site implements an unboosted Type II fusion operation on the incoming qubits. One of ordinary skill will appreciate that any type of fusion operation can be applied (and may be boosted or unboosted) without departing from the scope of the present disclosure. Additional examples of Type II fusion circuits are shown and described in Section 5 below for both polarization encoding and dual rail path encoding. In some embodiments the fusion controller 319 can also provide a control signal to the detector 603, 605, 607, 609. A control signal can be used, e.g., for gating the detectors or for otherwise controlling the operation of the detectors. Each of the detectors 603, 605, 607, 609 provides photon detection signal (representing the number of photons detected by the detector, e.g., 0 photons detected, 1 photon detected, two photons detected, etc.), and this photon detection signal can be preprocessed at the fusion site 601 to determine a measurement outcome (e.g., fusion success or not) or passed directly to the decoder 333 for further processing.

3. An Example of FBQC Employing GHZ Resource States

Figure 7A:
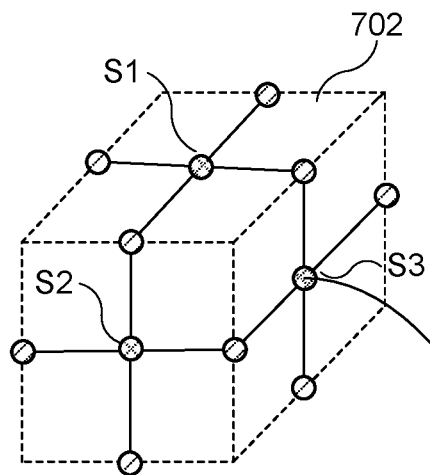
FIGS. 7A-7C illustrates a fusion based quantum computing scheme for fault tolerant quantum computation in accordance with one or more embodiments.
Figure 7B:
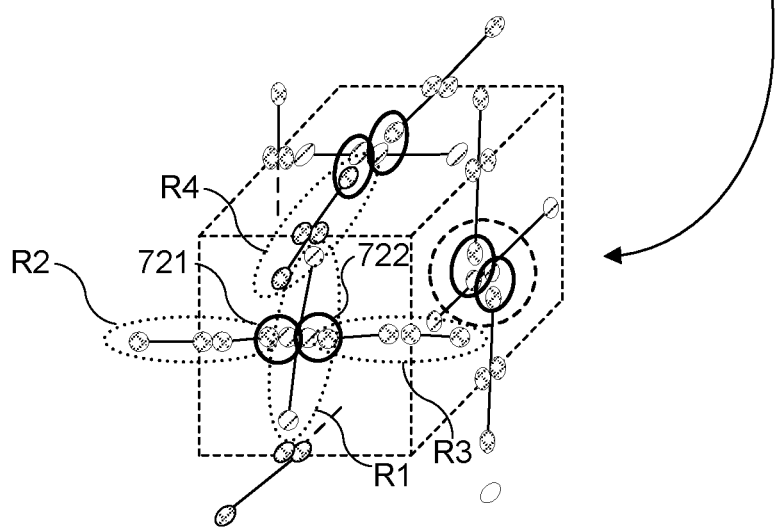

FIGS. 7A-7B illustrate an FBQC scheme for fault tolerant quantum computation in accordance with one or more embodiments. In this example a topological code known as the Raussendorf lattice (also known as the foliated surface code) is used but any other error correcting code can be used without departing from the scope of the present disclosure. For example, FBQC can be implemented for various volume codes (such as the diamond code, triamond code, etc.), various color codes, or other topological codes can be used without departing from the scope of the present disclosure.

FIG. 7A illustrates one unit cell 702 of a Raussendorf lattice. For the case of measurement based quantum computing, to determine the value of the syndrome graph, referred to herein as $P_{cell}$, at the center of the unit cell, the qubits on the six faces of the unit cell are measured in the x-basis resulting in a set of 0 or 1 eigenvalues being determined for each of the six $M_x$ measurements. These eigenvalues are then combined as follows $$P_{cell-MBQC} = \left[\sum_{i=1}^{6} M_x(S_i)\right] \mod 2. \qquad (2)$$

where $S_1, S_2, \ldots, S_6$ correspond to the six sites on the faces of the unit cell and $M_x(S_i)$ corresponds to the measurement outcomes (0 or 1) obtained by measuring the corresponding face qubits in the x basis. ($S_1$, $S_2$, and $S_3$ are labeled in FIG. 7; $S_4$, $S_5$, and $S_6$ are located on the hidden faces of unit cell 702.)

In FBQC, the goal is to generate, through a series of joint measurements (e.g., a positive-operator valued measure, also referred to as a POVM) on two or more qubits, a set of classical data that corresponds to the error syndrome of some quantum error correcting code. For example, using the Raussendorf unit cell of FIG. 7A as an illustrative example, the set of measurements that can be used to generate the syndrome graph value in an FBQC approach is shown in FIG. 7B. In this example, GHZ states are used as the resource states, but one of ordinary skill having the benefit of this disclosure will appreciate that any suitable resource state can be used without departing from the scope of the present disclosure. To get from the MBQC scheme shown in FIG. 7A to the FBQC scheme shown in FIG. 7B, every face qubit of FIG. 7A is replaced with individual qubits from distinctly separate (i.e., not entangled) resource states. For instance, four resource states R1, R2, and R3 (encircled by dotted ellipses), are each contributing at least one qubit to what would be the face qubit S2 of the Raussendorf cell are labeled in FIG. 7B. For example, the face qubit S2 in FIG. 7A is replaced with 4 qubits, from three different resource states: resource state R1 contributes two qubits; resource state R2 contributes a third qubit; and resource state R3 contributes the fourth qubit. In operation, the system will perform two fusions at each face (e.g., circles 721, 722 in FIG. 7B represent fusions between the contributing qubits of resource state R2 and R1 and R3 and R1, respectively). In an example where the fusions are Type II fusions, all four face qubits are measured, thereby generating four measurement results. The syndrome graph value for the cell is obtained by Eq. (2) above, but now with $$M_x(S_i) = [F_{1,XX}(S_i) + F_{2,XX}(S_i)] \mod 2 \quad (3)$$

where, for the ith face, $F_{1,XX}(S_i)$ is the measurement outcome obtained by performing the joint measurement on the qubits associated with fusion 1 (e.g., as indicated by circle 721), with the fusion 1 being a type II fusion performed in the XX basis and where $F_{2,XX}(S_i)$ is the measurement outcome obtained by performing the joint measurement on the qubits associated with fusion 2 (e.g., as indicated by circle 722), with the fusion 2 also being a type II fusion performed in the XX basis. Like the measurements associated with the X observable described above in reference to Eqn. (2), the fusion measurements of the observable XX (and ZZ) take the values of zero or 1 corresponding to the positive or negative eigenvectors, respectively, of the measured operators (XX and ZZ, in this example). In view of Eq. (3), to obtain each measurement on a face $M_x(S_i)$, correct fusion outcomes for both the fusion measurements $F_{1,XX}(S_i)$ and $F_{2,XX}(S_i)$ are desired. However, if due to some error either fusions fails so that values for the operators cannot be recovered, then in some embodiments, the measurement of the face is considered failed and results in at least one erased edge in the syndrome graph data. One of ordinary skill having the benefit of this disclosure will appreciated that errors can be dealt with by the decoder in a manner that is analogous to that described above in reference to FIGS. 1A-1C. One of ordinary skill in the art will also recognize that while our description of Eqn. (3) focused on the XX observable, the fusion can also produce the measurement of the ZZ observable and that those outcomes can also be combined as per Eqn. (3) to produce an independent set of syndrome graph date. In some embodiments these two sets of syndrome data are referred to as the primal and dual syndrome graphs.

Figure 7C:
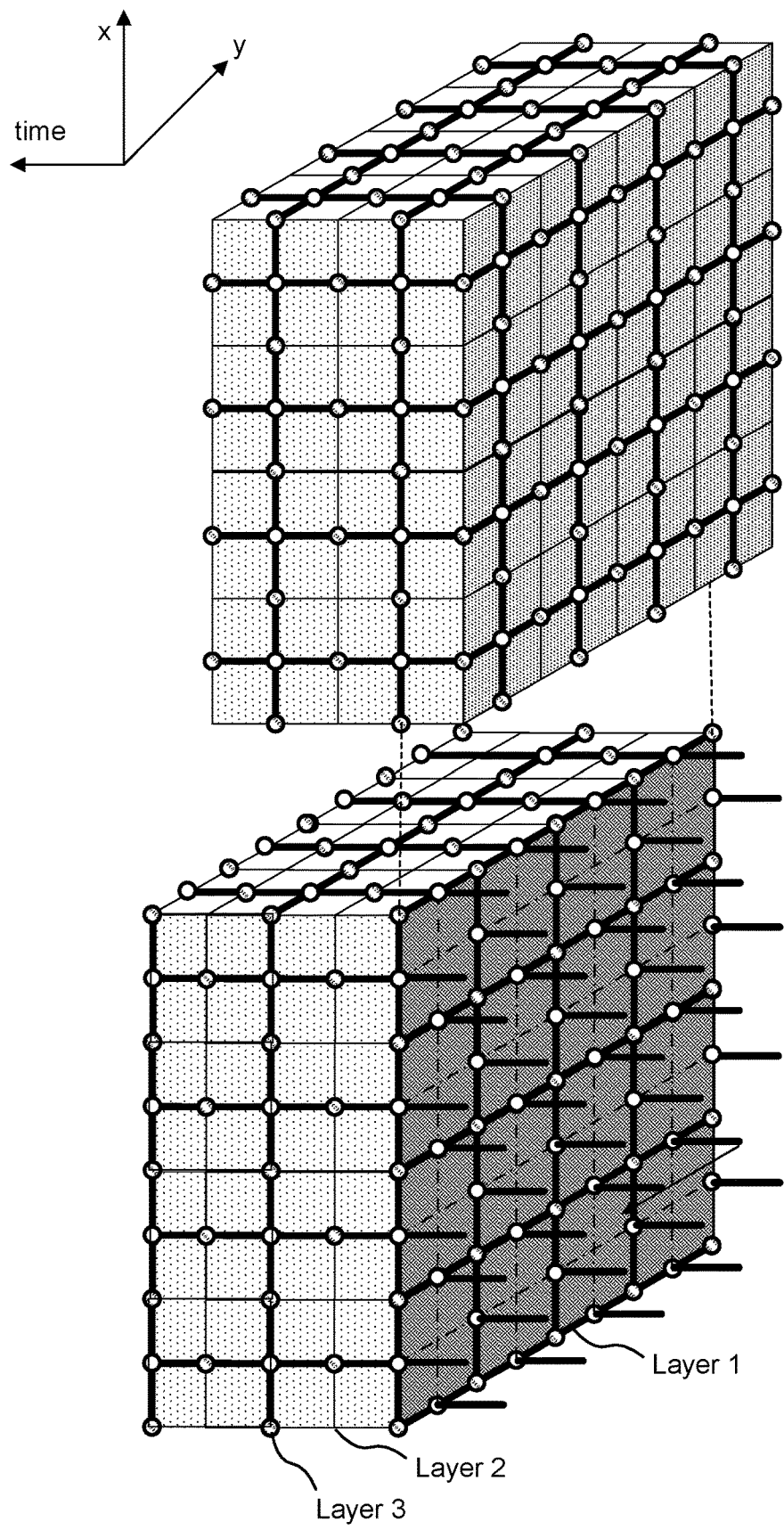

FIG. 7C shows an example of a cluster state made up on several unit cells of the Raussendorf lattice. In an MBQC approach, this entire cluster state would need to be generated, forming an entangled state of many qubits with the entanglement of the state extending across the lattice from one surface boundary to another. In the MBQC approach it is this large entangled cluster state that serves as the quantum error correcting code and thus can encode the logical qubit. Computation proceeds by performing single qubit measurements on each qubit of the entangled state to generate the measurement outcomes that are used to generate the syndrome graph that is fed to the decoder as described above in reference to FIGS. 1A-1C. As such, increasing the error tolerance of the computation requires an increase to the size of the lattice and therefore an increase to the size of the entangled state. In one or more embodiments of the FBQC approach disclose herein, such a large entangled cluster state is not necessary, but rather, smaller resource states are generated, with the size of the resource states being independent of the of the required error tolerance. As described in detail above in reference to FIG. 7, the FBQC approach can be constructed from any fault tolerant lattice by replacing each node of the lattice with a set of fusions between two or more adjacent resource states. This construction of replacing each node of the lattice with a resource state/fusions is merely one example of obtaining an FBQC scheme and one of ordinary skill having the benefit of this disclosure will recognize that many different ways of constructing an FBQC scheme from a fault tolerant lattice can be employed without departing from the scope of the present disclosure.

Furthermore, as described in more detail below, the process can proceed by generating a layer of resource states in a given clock cycle and performing fusions within each layer, as described in FIG. 8-9 below. For example, in FIG. 7C, the horizontal direction represents time in the sense that all or a subset of the qubits in any given layer in the x-y plane can be generated/initialized at the same clock cycle, e.g., qubits in Layer 1 can be generated at clock cycle 1, qubits in layer 2 can be generated at clock cycle 2, qubits in layer 3 can be generated at clock cycle 3, etc. As will be described in more detail below, a certain subset qubits in each layer can be stored/delayed such that they are available to be fused with qubits from resource states in a subsequent layer, if necessary to enable fault tolerance.

Figure 8A:
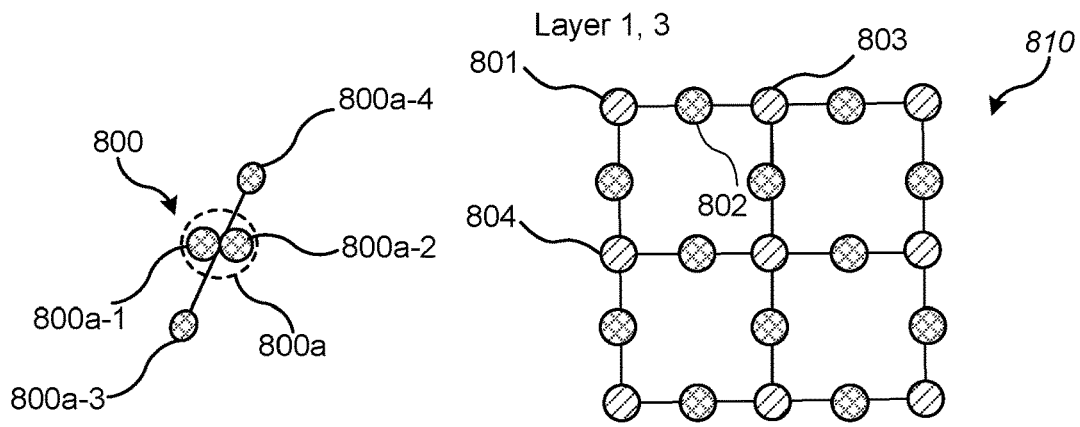
FIGS. 8A-8C show one example of a lattice preparation protocol for fusion based quantum computing in accordance with some embodiments.
Figure 8B:
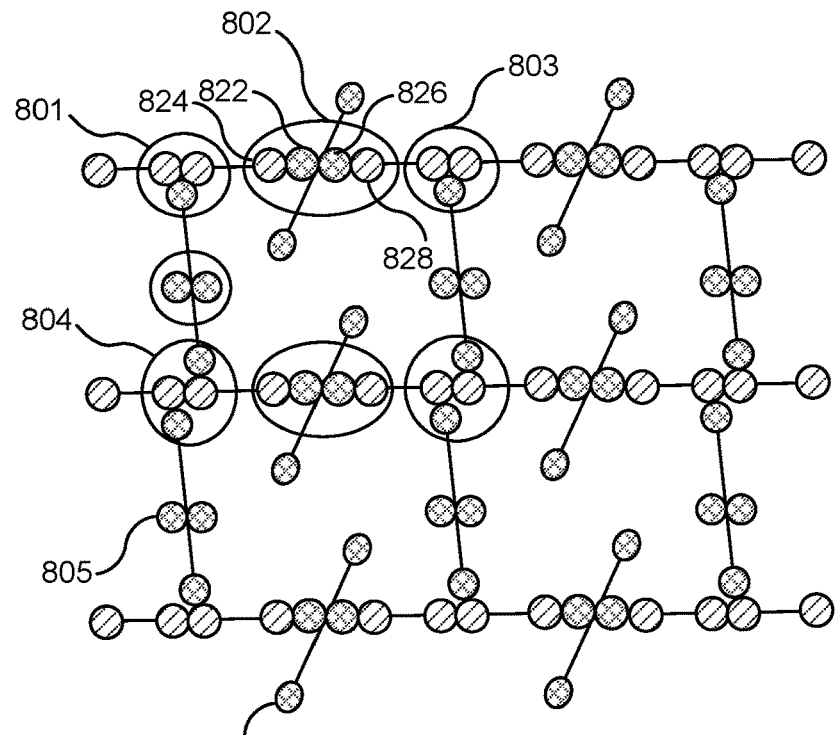

In some embodiments, in order to generate a desired error syndrome, a lattice preparation protocol (LPP) can be designed that generates the appropriate syndrome graph from the fusions of multiple smaller entangled resource states. FIGS. 8-9 show an example of a lattice preparation protocol according to some embodiments. For the purposes of illustration, the resource states are states such as resource state 800 shown in FIG. 8A; however other resource states can be used without departing from the scope of the present disclosure. The resource state 800 is equivalent to a GHZ state up to the application of Hadamard gates to single qubits. For example, the states used in the example disclosed herein are equivalent to GHZ states up to the application of Hadamard gates to the two terminating end qubits 800a-3 and 800a-4 in FIG. 8A. More specifically, a 4-GHZ state can be identified as a stabilizer state having the following stabilizers: (XXXX, ZZII, ZIZI, ZIIZ). The resource state 800 shown in FIG. 8A is closely related to this GHZ state, but the stabilizers of state 800 are (XXZZ, ZZII, ZIXI, ZIIX) (with the ordering of the operators corresponding to qubits 800a-1, 800a-2, 800a-3, and 800a-4, respectively). One of ordinary skill will appreciate that 4-GHZ state and the resource state 800 are equivalent under the application of a Hadamard gate on qubits 800-a3 and 800-a4.

Figure 8C:
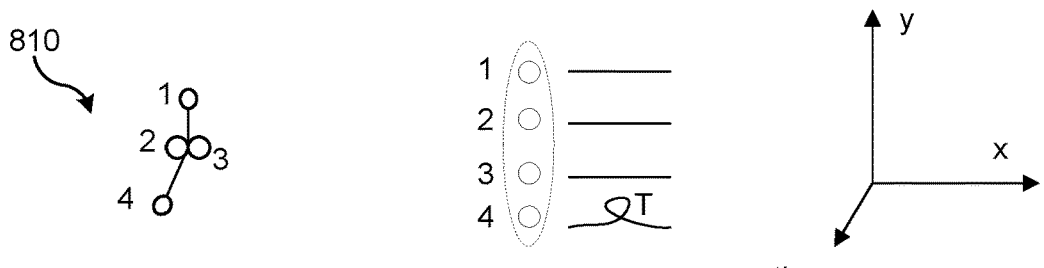

The time direction in FIGS. 8-9 is perpendicular to the page such that a resource state having a shape such as resource state 810 represents a collection of qubits, qubits 1, 2, and 3 that are mutually entangled within the same clock cycle and qubit 4 which is entangled in the time dimension with, e.g., qubits 2 and 3. Such a resource state can be created by, e.g., generating the full 4 qubit resource state in a single clock cycle and then storing qubit 4 for a fixed time period (e.g., one clock cycle) in a memory. As used herein the term "memory" includes at any type of memory, e.g., a quantum memory, a qubit delay line, a shift register for qubits, a qubit itself, and the like. In the case of photonic resource states, qubit memories such as these are equivalent to qubit delays and can thus be implemented through the use of optical fiber. In the example shown in FIG. 8C, the delay to qubit 4 is represented schematically by a loop of additional optical path length (e.g. provided by an optical fiber) placed inline with the existing optical path of the qubit but that is not present in the optical path of qubits 1-3. In this example the length of the fiber is such that it implements a single clock cycle delay of duration T but other delays are possible as well, e.g., 2T, 3T, etc. In terms of physical delay times, such delays could be in the range of 500 ps-500 ns but any delay is possible without departing from the scope of the present disclosure.

Returning to the FBQC process disclosed herein, FIGS. 8-9 show an example of how a lattice preparation and measurement protocol for FBQC can proceed according to layers. FIG. 8A shows a portion of the underlying layer of the Raussendorf lattice shown as layer 810 (corresponding to a portion of Layer 1 shown in FIG. 7C). In the example illustrated here, to process a layer like that shown in FIG. 8A, first multiple resource states 800 are generated (e.g., in qubit entangling system 303 of FIG. 3). In this example, the resource state 800 is an entangled state comprising 4 physical qubits (also referred to herein as quantum sub-systems): qubits 800a-1, 800a-2, 800a-3, 800a-4. In some embodiments, the resource state 800 can take the form of a 4-GHZ state where the two terminating end qubits 800a-4 and 800a-3 have undergone a Hadamard operation (e.g., for the case of a dual rail encoded qubit, by way of applying a 50:50 beamsplitter between the two rails that form the qubit). In some embodiments, not all qubits in the layer are subject to fusions in this clock cycle, but rather some of the qubits generated during this clock cycle from certain resource states can be delayed, e.g., the measurement of qubit 820, redundantly encoded qubit 805, or any other qubit can be delayed so that the qubit will be available at the next clock cycle. Such delayed qubits are then available to be fused with one or more qubits from resource states that will only be available for fusions at the next clock cycle.

In examples that employ a photonic implementation, the qubits from the resource states can then be routed appropriately (via integrated waveguides, optical fiber, or any other suitable photonic routing technology) to the qubit fusion system (e.g., qubit fusion system 305 of FIG. 3) to enable a set of fusion measurements that implement quantum error correction, i.e., that will result in collecting the measurement outcomes that correspond to the error syndrome of choice. While this example explicitly uses a topological code based on the Raussendorf lattice, any code can be used without departing from the scope of the present disclosure.

FIG. 8B shows an example of a collection of GHZ resource states arranged, i.e., that they have been pre-routed, such that the qubits that are to be sent to a given fusion gate are positioned graphically adjacent to each other. For qubits that are adjacent to each other in this illustration, respective fusions can be performed between pairs of qubits (also referred to herein as respective quantum sub-systems, with each qubit from the pair of qubits input on a fusion site belonging to a different respective resource state). For example, at site 802, two Type II fusion measurements can be applied, one between qubits 822 and 824 and one between qubits 826 and 828. It should be noted that before the fusions are performed qubits 822 and 824 (or qubits 826 and 828) are not entangled with one another but instead are each part of a distinct resource state. As such, the large entangled cluster state known as the Raussendorf lattice is not present before the fusion measurements are performed.

Figure 9A:
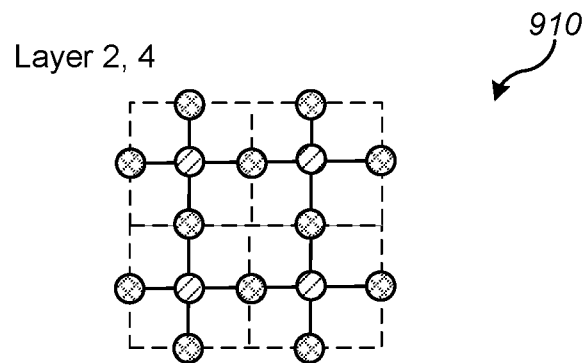
FIGS. 9A-9B show one example of a lattice preparation protocol for fusion based quantum computing in accordance with some embodiments.
Figure 9B:
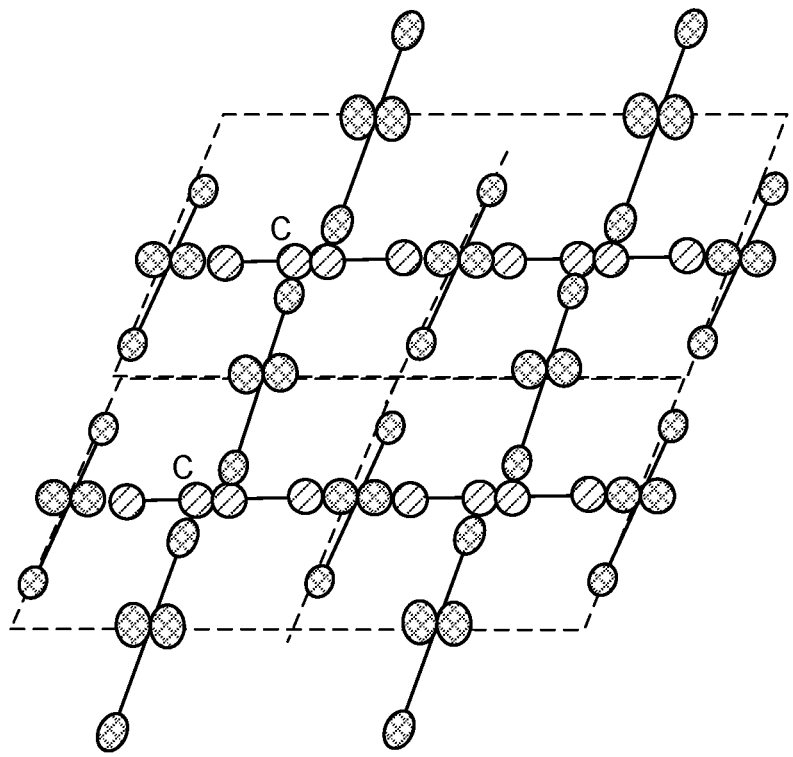

Referring to FIG. 9A, a portion of a second layer of the underlying code structure is shown as layer 910 (corresponding to layer 2 shown in FIG. 7C). In an FBQC system, to process a single layer like that shown in FIG. 9B the FBQC method proceeds along the same lines as described above in reference to FIGS. 8A-8B so the details will not be repeated here.

FIGS. 10A-10E show in further detail a method for performing FBQC in accordance with one or more embodiments. More specifically, the method described here includes steps for performing the joint measurements for a particular quantum error correcting code according to some embodiments, where the different layers of the code may be generated at different time steps (clock cycles) as introduced above in reference to FIGS. 8-9 and entangled together in a manner that provides for fusions measurements to extract the necessary syndrome information for performing quantum error correction. Like other examples provided herein, the Raussendorf lattice is used for the sake of illustration but other codes can be used without departing from the scope of the present disclosure.

Figure 10A:
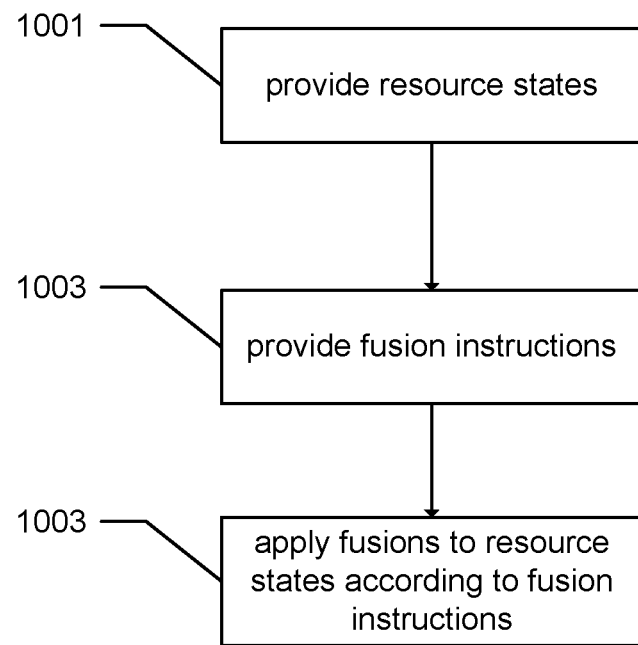

For example, FIGS. 10A and 10B shows portions of layers 1 and 3, and layers 2 and 4, respectively, from the Raussendorf lattice of FIG. 7C (referred to here as the quantum error correcting (QEC) code). FIGS. 10C and 10D illustrate a method for processing these layers in an FBQC system, including example resource states that could be used. For the sake of example, the description is limited to vertices 1, 2, 3, and 4 of the QEC code and the example focuses on how to perform the resource state generation and measurements in an FBQC system.

Returning to FIG. 10A, in step 1001, a first set of the resource states are provided during a first clock cycle. FIG. 10D shows one example where, instead of single qubits being provided at vertices 1, 2, 3, 4, 5, etc. with those single qubits being mutually entangled across the lattice (as would be the case for a MBQC system), two or more qubits are provided, each originating from different, non-entangled, resource states, e.g., respective resource states A, B, C, D, E, F, and G. As used herein, the notation $A^i_j$ is used to denote the j-th qubit from the A-th resource state of the i-th layer. For example, the A-th resource state of layer 1 in FIG. 10D is a GHZ state that includes 4 qubits, labeled $A^1_1$, $A^1_2$, $A^1_3$, $A^1_4$ as shown. Likewise, the qubits comprising resource state B that is provided as part of layer 1 can be labeled as $B^1_1$, $B^1_2$, $B^1_3$, $B^1_4$ (but this time with labels not explicitly shown in the figure to avoid cluttering the diagram). Qubits that will be fused to generate the syndrome information associated with vertices 1, 2, 3, 4, 5 are also shown as enclosed by solid ellipses 1, 2, 3, and 4 in FIG. 10D. As used herein these vertices are each associated with hardware for performing Type II fusions at fusion sites, as described above in reference to FIGS. 3-6.

In some embodiments, the resource states for any given layer can be generated/provided by a qubit entangling system such as that described above in reference to FIGS. 3 and 4. However, one of ordinary skill having the benefit of this disclosure will understand that any qubit entangling system can be employed, and that a given qubit entangling system can employ many different types of resource state generators, even generating different types of resource states. In this sense, an FBQC system is completely agnostic to the choice of resource states and choice of architecture for the qubit entangling system, or even the architecture of the qubit itself, thereby leaving the system designer a great deal of flexibility to implement a system that results in the highest threshold for the given the prevailing error/noise sources.

In Step 1003, fusion instructions in the form of classical data (also referred to herein as a fusion pattern) are provided to the fusion sites. Referring back to FIG. 3, for example, fusion pattern data frame 317 is one example of the set of fusion instructions (e.g., Type II fusion measurements in the XX basis) that can be applied between pairs of qubits from different entangled resource states at a fusion site during a certain clock cycle as a quantum application is executed on the FBQC system. As also described above, in some embodiments, several fusion pattern data frames can be stored in memory as classical data. In some embodiments, the fusion pattern data frames can dictate whether or not XX Type II Fusion is to be applied (or whether any other type of fusion, or not, is to be applied) for a particular fusion gate within the fusion site. In addition, the fusion pattern data frames can indicate that the Type II fusion is to be performed in a different basis, e.g., XX, XY, ZZ, etc.

Returning to FIG. 10D, the fusion instructions for Layer 1 can include fusion parameters (qubit location and basis) to fuse two or more qubits from different resource states (also referred to herein as respective quantum sub-systems because the qubits reside in, or are part of, respectively separate resource states). For example, for fusion site 1 the fusion instructions can specify the fusion parameters to indicate that XX Type II Fusions are to be performed between qubits from resource states $A^1$, $B^1$, and $C^1$ (and similarly for site 3 between $E^1$, $F^1$, and $G^1$). More specifically, the two Type II Fusions to be performed at fusion site 1 can be specified to be between $A^1_4$ and $B^1_2$ and between $C^1_1$ and $B^1_3$. Similar instructions are provided for the other fusion sites in the layer. For example, for fusion site 2, the fusion instructions can specify the fusion parameters to indicate that XX Type II Fusions are to be performed between qubits from resource states $B^1$, $D^1$, and $F^1$. More specifically, the two Type II Fusions to be performed at fusion site 2 can be specified to be between $B^1_4$ and $D^1_2$ and between $D^1_3$ and $F^1_4$. However, unlike the case for fusion site 1, where all the qubits were measured, fusion site 2 includes a qubit that is to remain unmeasured until the second clock cycle. This is because the underlying structure of the QEC lattice requires that the quantum state of this qubit to be preserved until it is to be fused to a qubit from a different layer at a different clock cycle, i.e., if this were an MBQC scheme the qubit associated with this vertex would be one that is entangled with qubit in another layer, e.g., qubits 2 and 6 shown in FIGS. 10B and 10C, respectively.

Returning to the explicit example shown in FIG. 10D, the fusion instructions can specify that $D^1_4$ will not be measured until the next clock cycle, where it will be fused from qubits in a later layer, e.g., layer 2 shown in FIG. 10E. In a photonic implementation optical fiber can implement a qubit delay for the above function, serving as a reliable quantum memory to store qubits until they are needed for a future clock cycle. As used herein, these unmeasured (delayed) qubits are referred to as unmeasured quantum sub-systems.

Moving on to fusion site 4, this site is an example that includes fusions between layers, i.e., fusion between qubits from resource states that were generated in this clock cycle with qubits from resource states that were generated in a prior clock cycle but were not measured at that time but instead were delayed, or equivalently, stored until the next clock cycle. For fusion site 4, the fusion instructions can specify the fusion parameters to indicate that XX Type II Fusions are to be performed between qubits from resource states in three different layers $C^1$, $B^0$, and $B^2$. The fusion instructions can also include instructions to delay (not measure) qubits $C^1_2$ and $C^1_3$ until the next clock cycle. For example, in this case, the fusion instructions can indicate that in the next time step, $C^1_2$ is to be fused with $B^0_4$ and $C^1_3$ is to be fused with $B^2_1$.

In Step 1003, the fusion operations that are specified by the fusion instructions are performed, thereby generating classical data in the form of fusion measurement outcomes. As described above in reference to FIGS. 3-6 and Eq. (2), this classical data is then passed to the decoder and is used to construct the syndrome graph to be used for quantum error correction.

These examples are illustrative. The choice of error correcting code determines the set of qubit pairs that are fused from certain resource states, such that the output of the qubit fusion system is the classical data from which the syndrome graph can be directly constructed. In some embodiments, the classical error syndrome data is generated directly from the qubit fusion system without the need to preform additional single particle measurements on any remaining qubits. In some embodiments, the joint measurements performed at the qubit fusion system are destructive of the qubits upon which joint measurement is performed.

4. Introduction to Qubits and Path Encoding

The dynamics of quantum objects, e.g., photons, electrons, atoms, ions, molecules, nanostructures, and the like, follow the rules of quantum theory. More specifically, in quantum theory, the quantum state of a quantum object, e.g., a photon, is described by a set of physical properties, the complete set of which is referred to as a mode. In some embodiments, a mode is defined by specifying the value (or distribution of values) of one or more properties of the quantum object. For example, again for photons, modes can be defined by the frequency of the photon, the position in space of the photon (e.g., which waveguide or superposition of waveguides the photon is propagating within), the associated direction of propagation (e.g., the k-vector for a photon in free space), the polarization state of the photon (e.g., the direction (horizontal or vertical) of the photon's electric and/or magnetic fields) and the like.

For the case of photons propagating in a waveguide, it is convenient to express the state of the photon as one of a set of discrete spatio-temporal modes. For example, the spatial mode $k_i$ of the photon is determined according to which one of a finite set of discrete waveguides the photon can be propagating in. Furthermore, the temporal mode $t_j$ is determined by which one of a set of discrete time periods (referred to herein as "bins") the photon can be present in. In some embodiments, the temporal discretization of the system can be provided by the timing of a pulsed laser which is responsible for generating the photons. In the examples below, spatial modes will be used primarily to avoid complication of the description. However, one of ordinary skill will appreciate that the systems and methods can apply to any type of mode, e.g., temporal modes, polarization modes, and any other mode or set of modes that serves to specify the quantum state. Furthermore, in the description that follows, embodiments will be described that employ photonic waveguides to define the spatial modes of the photon. However, one of ordinary skill having the benefit of this disclosure will appreciate that any type of mode, e.g., polarization modes, temporal modes, and the like, can be used without departing from the scope of the present disclosure.

For quantum systems of multiple indistinguishable particles, rather than describing the quantum state of each particle in the system, it is useful to describe the quantum state of the entire many-body system using the formalism of Fock states (sometimes referred to as the occupation number representation). In the Fock state description, the many-body quantum state is specified by how many particles there are in each mode of the system. Because modes are the complete set of properties, this description is sufficient. For example, a multi-mode, two particle Fock state $|1001\rangle_{1,2,3,4}$ specifies a two-particle quantum state with one photon in mode 1, zero photons in mode 2, zero photons in mode three, and 1 photon in mode four. Again, as introduced above, a mode can be any set of properties of the quantum object (and can depend on the single particle basis states being used to define the quantum state). For the case of the photon, any two modes of the electromagnetic field can be used, e.g., one may design the system to use modes that are related to a degree of freedom that can be manipulated passively with linear optics. For example, polarization, spatial degree of freedom, or angular momentum, could be used. For example, the four-mode system represented by the two particle Fock state $|1001\rangle_{1,2,3,4}$ can be physically implemented as four distinct waveguides with two of the four waveguides (representing mode 1 and mode 4, respectively) having one photon travelling within them. Other examples of a state of such a many-body quantum system are the four photon Fock state $|1111\rangle_{1,2,3,4}$ that represents each waveguide containing one photon and the four photon Fock state $|2200\rangle_{1,2,3,4}$ that represents waveguides one and two respectively housing two photons and waveguides three and four housing zero photons. For modes having zero photons present, the term "vacuum mode" is used. For example, for the four photon Fock state $|2200\rangle_{1,2,3,4}$ modes 3 and 4 are referred to herein as "vacuum modes" (also referred to as "ancilla modes").

As used herein, a "qubit" (or quantum bit) is a physical quantum system with an associated quantum state that can be used to encode information. Qubits, in contrast to classical bits, can have a state that is a superposition of logical values such as 0 and 1. In some embodiments, a qubit is "dual-rail encoded" such that the logical value of the qubit is encoded by occupation of one of two modes by exactly one photon (a single photon). For example, consider the two spatial modes of a photonic system associated with two distinct waveguides. In some embodiments, the logical 0 and 1 values can be encoded as follows:

$$|0\rangle_L = |10\rangle_{1,2} \quad (1)$$

$$|1\rangle_L = |01\rangle_{1,2} \quad (2)$$

where the subscript "L" indicates that the ket represents a logical value (e.g., a qubit value) and, as before, the notation $|ij\rangle_{1,2}$ on the right-hand side of the Equations (1)-(2) above indicates that there are i photons in a first waveguide and j photons in a second waveguide, respectively (e.g., where i and j are integers). In this notation, a two qubit state having a logical value $|01\rangle_L$ (representing a state of two qubits, the first qubit being in a '0' logical state and the second qubit being in a '1' logical state) may be represented using photon occupations across four distinct waveguides by $|1001\rangle_{1,2,3,4}$ (i.e., one photon in a first waveguide, zero photons in a second waveguide, zero photons in a third waveguide, and one photon in a fourth waveguide). In some instances, throughout this disclosure, the various subscripts are omitted to avoid unnecessary mathematical clutter.

5. LOQC Introduction

5.1. Dual Rail Photonic Qubits

Qubits (and operations on qubits) can be implemented using a variety of physical systems. In some examples described herein, qubits are provided in an integrated photonic system employing waveguides, beam splitters (or directional couplers), photonic switches, and single photon detectors, and the modes that can be occupied by photons are spatiotemporal modes that correspond to presence of a photon in a waveguide. Modes can be coupled using mode couplers, e.g., optical beam splitters, to implement transformation operations, and measurement operations can be implemented by coupling single-photon detectors to specific waveguides. One of ordinary skill in the art with access to this disclosure will appreciate that modes defined by any appropriate set of degrees of freedom, e.g., polarization modes, temporal modes, and the like, can be used without departing from the scope of the present disclosure. For instance, for modes that only differ in polarization (e.g., horizontal (H) and vertical (V)), a mode coupler can be any optical element that coherently rotates polarization, e.g., a birefringent material such as a waveplate. For other systems such as ion trap systems or neutral atom systems, a mode coupler can be any physical mechanism that can couple two modes, e.g., a pulsed electromagnetic field that is tuned to couple two internal states of the atom/ion.

Figure 11A:
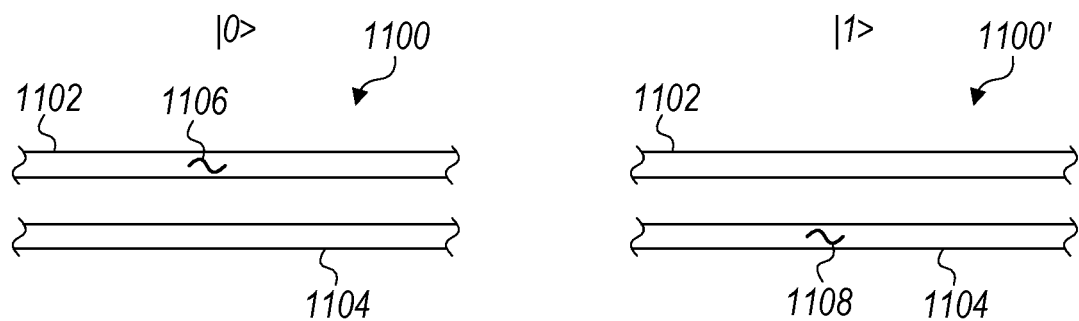
FIGS. 11A-11E show representations of dual-rail-encoded photonic qubits and photonic circuits for performing unitary operation on photonic qubits in accordance with some embodiments.

In some embodiments of a photonic quantum computing system using dual-rail encoding, a qubit can be implemented using a pair of waveguides. FIG. 11A shows two representations (1100, 1100') of a portion of a pair of waveguides 1102, 1104 that can be used to provide a dual-rail-encoded photonic qubit. At 1100, a photon 1106 is in waveguide 1102 and no photon is in waveguide 1104 (also referred to as a vacuum mode); in some embodiments, this corresponds to the $|0\rangle$ state of a photonic qubit. At 1100', a photon 1108 is in waveguide 1104, and no photon is in waveguide 1102; in some embodiments this corresponds to the $|1\rangle$ state of the photonic qubit. To prepare a photonic qubit in a known state, a photon source (not shown) can be coupled to one end of one of the waveguides. The photon source can be operated to emit a single photon into the waveguide to which it is coupled, thereby preparing a photonic qubit in a known state. Photons travel through the waveguides, and by periodically operating the photon source, a quantum system having qubits whose logical states map to different temporal modes of the photonic system can be created in the same pair of waveguides. In addition, by providing multiple pairs of waveguides, a quantum system having qubits whose logical states correspond to different spatiotemporal modes can be created. It should be understood that the waveguides in such a system need not have any particular spatial relationship to each other. For instance, they can be but need not be arranged in parallel.

Occupied modes can be created by using a photon source to generate a photon that then propagates in the desired waveguide. A photon source can be, for instance, a resonator-based source that emits photon pairs, also referred to as a heralded single photon source. In one example of such a source, the source is driven by a pump, e.g., a light pulse, that is coupled into a system of optical resonators that, through a nonlinear optical process (e.g., spontaneous four wave mixing (SFWM), spontaneous parametric down-conversion (SPDC), second harmonic generation, or the like), can generate a pair of photons. Many different types of photon sources can be employed. Examples of photon pair sources can include a microring-based spontaneous four wave mixing (SPFW) heralded photon source (HPS). However, the precise type of photon source used is not critical and any type of source, employing any process, such as SPFW, SPDC, or any other process can be used. Other classes of sources that do not necessarily require a nonlinear material can also be employed, such as those that employ atomic and/or artificial atomic systems, e.g., quantum dot sources, color centers in crystals, and the like. In some cases, sources may or may not be coupled to photonic cavities, e.g., as can be the case for artificial atomic systems such as quantum dots coupled to cavities. Other types of photon sources also exist for SPWM and SPDC, such as optomechanical systems and the like.

In such cases, operation of the photon source may be deterministic or non-deterministic (also sometimes referred to as "stochastic") such that a given pump pulse may or may not produce a photon pair. In some embodiments, coherent spatial and/or temporal multiplexing of several non-deterministic sources (referred to herein as "active" multiplexing) can be used to allow the probability of having one mode become occupied during a given cycle to approach 1. One of ordinary skill will appreciate that many different active multiplexing architectures that incorporate spatial and/or temporal multiplexing are possible. For instance, active multiplexing schemes that employ log-tree, generalized Mach-Zehnder interferometers, multimode interferometers, chained sources, chained sources with dump-the-pump schemes, asymmetric multi-crystal single photon sources, or any other type of active multiplexing architecture can be used. In some embodiments, the photon source can employ an active multiplexing scheme with quantum feedback control and the like.

Measurement operations can be implemented by coupling a waveguide to a single-photon detector that generates a classical signal (e.g., a digital logic signal) indicating that a photon has been detected by the detector. Any type of photodetector that has sensitivity to single photons can be used. In some embodiments, detection of a photon (e.g., at the output end of a waveguide) indicates an occupied mode while absence of a detected photon can indicate an unoccupied mode. In some embodiments, a measurement operation is performed in a particular basis (e.g., a basis defined by one of the Pauli matrices and referred to as X, Y, or Z), and mode coupling as described below can be applied to transform a qubit to a particular basis.

Some embodiments described below relate to physical implementations of unitary transform operations that couple modes of a quantum system, which can be understood as transforming the quantum state of the system. For instance, if the initial state of the quantum system (prior to mode coupling) is one in which one mode is occupied with probability 1 and another mode is unoccupied with probability 1 (e.g., a state $|10\rangle$) in a Fock notation in which the numbers indicate occupancy of each state), mode coupling can result in a state in which both modes have a nonzero probability of being occupied, e.g., a state $a_1|10\rangle + a_2|01\rangle$), where $|a_1|^2 + |a_2|^2 = 1$. In some embodiments, operations of this kind can be implemented by using beam splitters to couple modes together and variable phase shifters to apply phase shifts to one or more modes. The amplitudes $a_1$ and $a_2$ depend on the reflectivity (or transmissivity) of the beam splitters and on any phase shifts that are introduced.

Figure 11B:
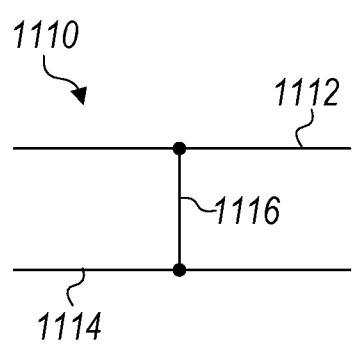

FIG. 11B shows a schematic diagram 1110 (also referred to as a circuit diagram or circuit notation) for coupling of two modes. The modes are drawn as horizontal lines 1112, 1114, and the mode coupler 1116 is indicated by a vertical line that is terminated with nodes (solid dots) to identify the modes being coupled. In the more specific language of linear quantum optics, the mode coupler 1116 shown in FIG. 11B represents a 50/50 beam splitter that implements a transfer matrix:

$$T = \frac{1}{\sqrt{2}} \begin{pmatrix} 1 & i \\ i & 1 \end{pmatrix}, \tag{4}$$

where T defines the linear map for the photon creation operators on two modes. (In certain contexts, transfer matrix T can be understood as implementing a first-order imaginary Hadamard transform.) By convention the first column of the transfer matrix corresponds to creation operators on the top mode (referred to herein as mode 1, labeled as horizontal line 1112), and the second column corresponds to creation operators on the second mode (referred to herein as mode 2, labeled as horizontal line 1114), and so on if the system includes more than two modes. More explicitly, the mapping can be written as:

$$\begin{pmatrix} a_1^\dagger \\ a_2^\dagger \end{pmatrix}_{input} \mapsto \frac{1}{\sqrt{2}} \begin{pmatrix} 1 & -i \\ -i & 1 \end{pmatrix} \begin{pmatrix} a_1^\dagger \\ a_2^\dagger \end{pmatrix}_{output}, \tag{5}$$

where subscripts on the creation operators indicate the mode that is operated on, the subscripts input and output identify the form of the creation operators before and after the beam splitter, respectively and where:

$$a_i|n_i,n_j\rangle = \sqrt{n_i}|n_i-1,n_j\rangle$$

$$a_j|n_i,n_j\rangle = \sqrt{n_j}|n_i,n_j-1\rangle$$

$$a_j^\dagger|n_i,n_j\rangle = n_j+1|n_i,n_j+1\rangle \tag{6}$$

For example, the application of the mode coupler shown in FIG. 11B leads to the following mappings:

$$a_{1_{input}}^\dagger \mapsto \frac{1}{\sqrt{2}}\left(a_{1_{output}}^\dagger - ia_{2_{output}}^\dagger\right) \tag{7}$$

$$a_{2_{input}}^\dagger \mapsto \frac{1}{\sqrt{2}}\left(-ia_{1_{output}}^\dagger + a_{2_{output}}^\dagger\right)$$

Thus, the action of the mode coupler described by Eq. (4) is to take the input states $|10\rangle$, $|01\rangle$, and $|11\rangle$ to $$|10\rangle \mapsto \frac{|10\rangle - i|01\rangle}{\sqrt{2}} \tag{8}$$

$$|01\rangle \mapsto \frac{-i|10\rangle + |01\rangle}{\sqrt{2}}$$

$$|11\rangle \mapsto \frac{-i}{2}(|20\rangle + |02\rangle)$$

Figure 11C:
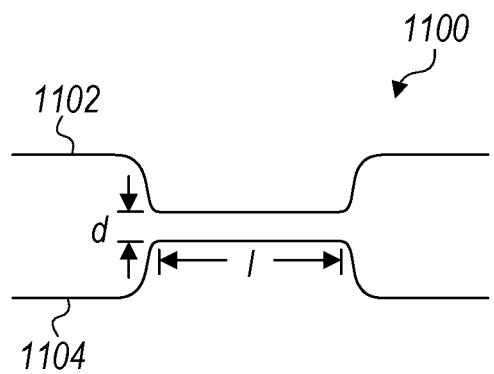

FIG. 11C shows a physical implementation of a mode coupling that implements the transfer matrix T of Eq. (4) for two photonic modes in accordance with some embodiments. In this example, the mode coupling is implemented using a waveguide beam splitter 1120, also sometimes referred to as a directional coupler or mode coupler. Waveguide beam splitter 1120 can be realized by bringing two waveguides 1122, 1124 into close enough proximity that the evanescent field of one waveguide can couple into the other. By adjusting the separation d between waveguides 1122, 1124 and/or the length l of the coupling region, different couplings between modes can be obtained. In this manner, a waveguide beam splitter 1120 can be configured to have a desired transmissivity. For example, the beam splitter can be engineered to have a transmissivity equal to 0.5 (i.e., a 50/50 beam splitter for implementing the specific form of the transfer matrix T introduced above). If other transfer matrices are desired, the reflectivity (or the transmissivity) can be engineered to be greater than 0.6, greater than 0.7, greater than 0.8, or greater than 0.9 without departing from the scope of the present disclosure.

In addition to mode coupling, some unitary transforms may involve phase shifts applied to one or more modes. In some photonic implementations, variable phase-shifters can be implemented in integrated circuits, providing control over the relative phases of the state of a photon spread over multiple modes. Examples of transfer matrices that define such a phase shifts are given by (for applying a +i and −i phase shift to the second mode, respectively):

$$s = \begin{pmatrix} 1 & 0 \\ 0 & i \end{pmatrix} \quad (9)$$

$$s^\dagger = \begin{pmatrix} 1 & 0 \\ 0 & -i \end{pmatrix}$$

For silica-on-silicon materials some embodiments implement variable phase-shifters using thermo-optical switches. The thermo-optical switches use resistive elements fabricated on the surface of the chip, that via the thermo-optical effect can provide a change of the refractive index n by raising the temperature of the waveguide by an amount of the order of 10-5 K. One of skill in the art with access to the present disclosure will understand that any effect that changes the refractive index of a portion of the waveguide can be used to generate a variable, electrically tunable, phase shift. For example, some embodiments use beam splitters based on any material that supports an electro-optic effect, so-called $\chi^2$ and $\chi^3$ materials such as lithium niobite, BBO, KTP, BTO, PZT, and the like and even doped semiconductors such as silicon, germanium, and the like.

5.2. Photonic Mode Coupler: Beam Splitters

Figure 11D:
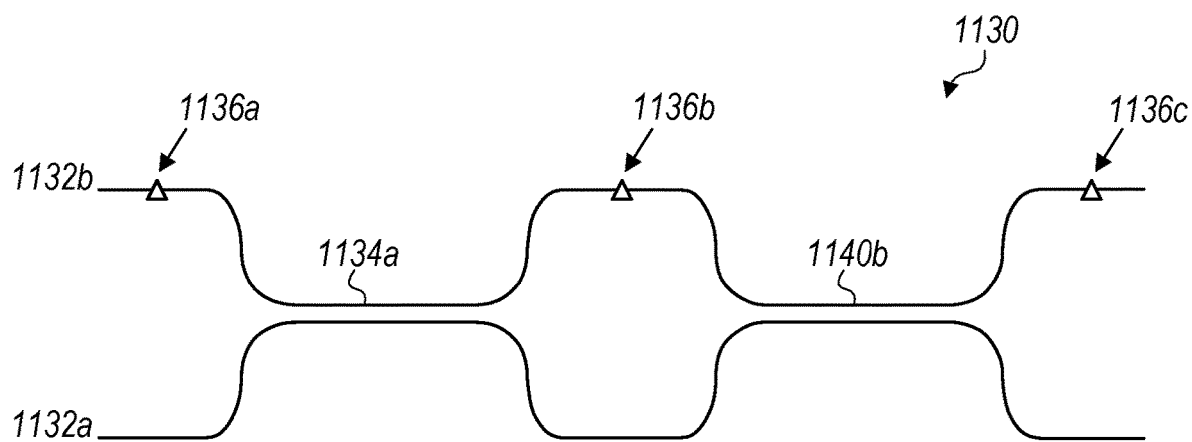
Figure 11E:
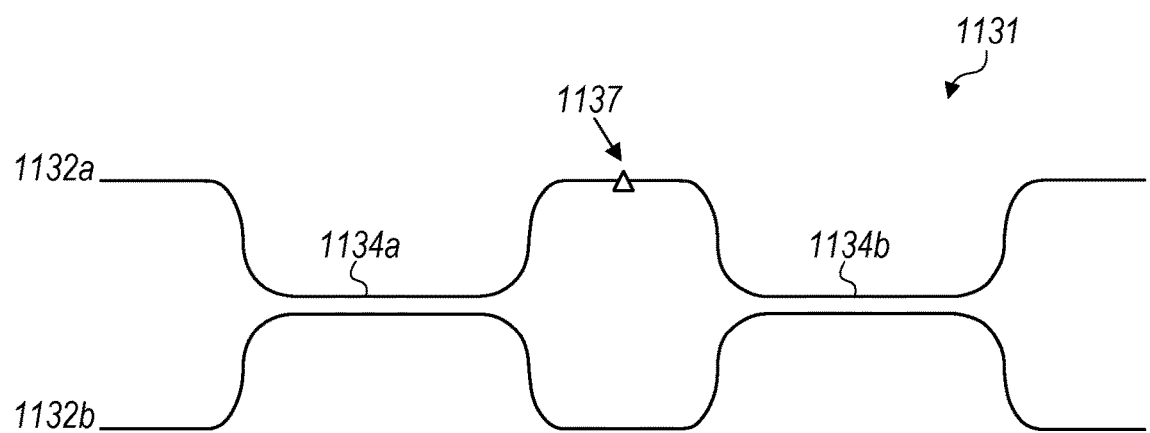

Beam splitters with variable transmissivity and arbitrary phase relationships between output modes can also be achieved by combining directional couplers and variable phase-shifters in a Mach-Zehnder Interferometer (MZI) configuration 1130, e.g., as shown in FIG. 11D. Complete control over the relative phase and amplitude of the two modes 1132a, 1132b in dual rail encoding can be achieved by varying the phases imparted by phase shifters 1136a, 1136b, and 1136c and the length and proximity of coupling regions 1134a and 1134b. FIG. 11E shows a slightly simpler example of a MZI 1140 that allows for a variable transmissivity between modes 1132a, 1132b by varying the phase imparted by the phase shifter 1137. FIGS. 11D and 11E are examples of how one could implement a mode coupler in a physical device, but any type of mode coupler/beam splitter can be used without departing from the scope of the present disclosure.

Figure 12A:
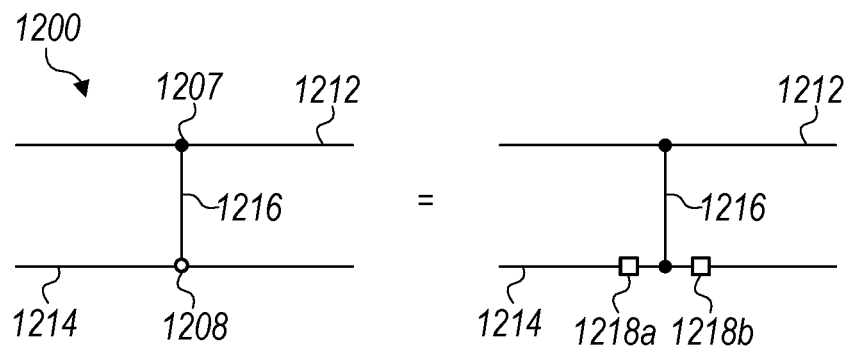
FIGS. 12A-12B show representations of dual-rail-encoded photonic qubits and photonic circuits for performing unitary operation on photonic qubits in accordance with some embodiments.
Figure 12B:
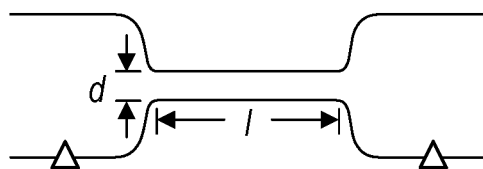

In some embodiments, beam splitters and phase shifters can be employed in combination to implement a variety of transfer matrices. For example, FIG. 12A shows, in a schematic form similar to that of FIG. 11A, a mode coupler 1200 implementing the following transfer matrix:

$$T_r = \frac{1}{\sqrt{2}} \begin{pmatrix} 1 & 1 \\ 1 & -1 \end{pmatrix}. \quad (10)$$

Thus, mode coupler 1200 applies the following mappings:

$$|10\rangle \mapsto \frac{|10\rangle + |01\rangle}{\sqrt{2}} \quad (11)$$

$$|01\rangle \mapsto \frac{|10\rangle - |01\rangle}{\sqrt{2}}$$

$$|11\rangle \mapsto \frac{1}{2}(|20\rangle + |02\rangle).$$

The transfer matrix $T_r$ of Eq. (10) is related to the transfer matrix T of Eq. (4) by a phase shift on the second mode. This is schematically illustrated in FIG. 12A by the closed node 1207 where mode coupler 1216 couples to the first mode (line 1212) and open node 1208 where mode coupler 1216 couples to the second mode (line 1214). More specifically, $T_r = sTs$, and, as shown at the right-hand side of FIG. 12A, mode coupler 1216 can be implemented using mode coupler 1216 (as described above), with a preceding and following phase shift (denoted by open squares 1218a, 1218b). Thus, the transfer matrix $T_r$ can be implemented by the physical beam splitter shown in FIG. 12B, where the open triangles represent +i phase shifters.

5.3. Example Photonic Spreading Circuits

Figure 13:
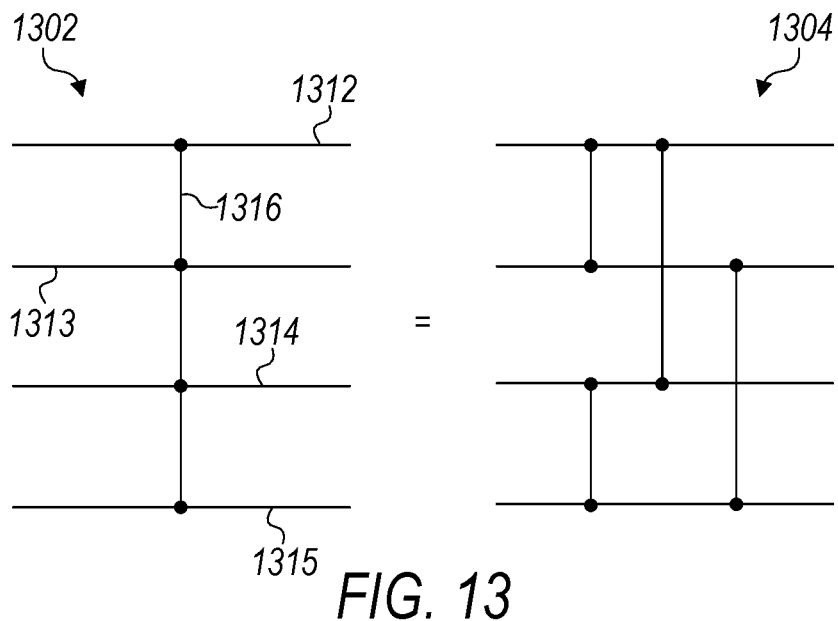
FIG. 13 shows photonic implementations of beam splitters that may be used to implement one or more spreaders, e.g., Hadamard gates, according to some embodiments.

Networks of mode couplers and phase shifters can be used to implement couplings among more than two modes. For example, FIG. 13 shows a four-mode coupling scheme that implements a "spreader," or "mode-information erasure," transformation on four modes, i.e., it takes a photon in any one of the input modes and delocalizes the photon amongst each of the four output modes such that the photon has equal probability of being detected in any one of the four output modes. (The well-known Hadamard transformation is one example of a spreader transformation.) As in FIG. 11A, the horizontal lines 1312-1315 correspond to modes, and the mode coupling is indicated by a vertical line 1316 with nodes (dots) to identify the modes being coupled. In this case, four modes are coupled. Circuit notation 1302 is an equivalent representation to circuit diagram 1304, which is a network of first-order mode couplings. More generally, where a higher-order mode coupling can be implemented as a network of first-order mode couplings, a circuit notation similar to notation 1302 (with an appropriate number of modes) may be used.

Figure 14:
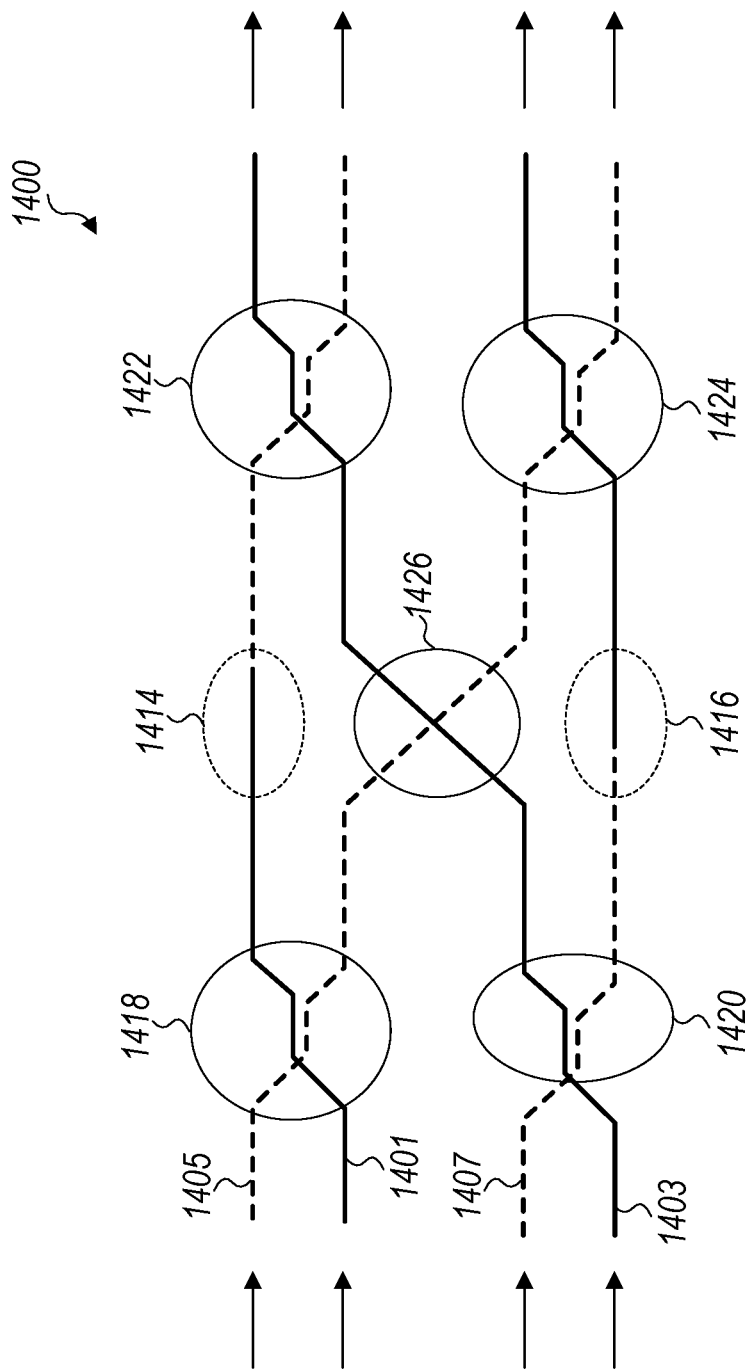
FIG. 14 shows photonic implementations of beam splitters that may be used to implement one or more spreaders, e.g., Hadamard gates, according to some embodiments.

FIG. 14 illustrates an example optical device 1400 that can implement the four-mode mode-spreading transform shown schematically in FIG. 13 in accordance with some embodiments. Optical device 1400 includes a first set of optical waveguides 1401, 1403 formed in a first layer of material (represented by solid lines in FIG. 14) and a second set of optical waveguides 1405, 1407 formed in a second layer of material that is distinct and separate from the first layer of material (represented by dashed lines in FIG. 14). The second layer of material and the first layer of material are located at different heights on a substrate. One of ordinary skill will appreciate that an interferometer such as that shown in FIG. 14 could be implemented in a single layer if appropriate low loss waveguide crossing were employed.

At least one optical waveguide 1401, 1403 of the first set of optical waveguides is coupled with an optical waveguide 1405, 1407 of the second set of optical waveguides with any type of suitable optical coupler. For example, the optical device shown in FIG. 14 includes four optical couplers 1418, 1420, 1422, and 1424. Each optical coupler can have a coupling region in which two waveguides propagate in parallel. Although the two waveguides are illustrated in FIG. 14 as being offset from each other in the coupling region, the two waveguides may be positioned directly above and below each other in the coupling region without offset. In some embodiments, one or more of the optical couplers 1418, 1420, 1422, and 1424 are configured to have a coupling efficiency of approximately 50% between the two waveguides (e.g., a coupling efficiency between 49% and 51%, a coupling efficiency between 49.9% and 50.1%, a coupling efficiency between 49.99% and 50.01%, and a coupling efficiency of 50%, etc.). For example, the length of the two waveguides, the refractive indices of the two waveguides, the widths and heights of the two waveguides, the refractive index of the material located between two waveguides, and the distance between the two waveguides are selected to provide the coupling efficiency of 50% between the two waveguides. This allows the optical coupler to operate like a 50/50 beam splitter.

In addition, the optical device shown in FIG. 14 can include two inter-layer optical couplers 1414 and 1416. Optical coupler 1414 allows transfer of light propagating in a waveguide on the first layer of material to a waveguide on the second layer of material, and optical coupler 1416 allows transfer of light propagating in a waveguide on the second layer of material to a waveguide on the first layer of material. The optical couplers 1414 and 1416 allow optical waveguides located in at least two different layers to be used in a multi-channel optical coupler, which, in turn, enables a compact multi-channel optical coupler.

Furthermore, the optical device shown in FIG. 14 includes a non-coupling waveguide crossing region 1426. In some implementations, the two waveguides (1403 and 1405 in this example) cross each other without having a parallel coupling region present at the crossing in the non-coupling waveguide crossing region 1426 (e.g., the waveguides can be two straight waveguides that cross each other at a nearly 90-degree angle).

Those skilled in the art will understand that the foregoing examples are illustrative and that photonic circuits using beam splitters and/or phase shifters can be used to implement many different transfer matrices, including transfer matrices for real and imaginary Hadamard transforms of any order, discrete Fourier transforms, and the like. One class of photonic circuits, referred to herein as "spreader" or "mode-information erasure (MIE)" circuits, has the property that if the input is a single photon localized in one input mode, the circuit delocalizes the photon amongst each of a number of output modes such that the photon has equal probability of being detected in any one of the output modes. Examples of spreader or MIE circuits include circuits implementing Hadamard transfer matrices. (It is to be understood that spreader or MIE circuits may receive an input that is not a single photon localized in one input mode, and the behavior of the circuit in such cases depends on the particular transfer matrix implemented.) In other instances, photonic circuits can implement other transfer matrices, including transfer matrices that, for a single photon in one input mode, provide unequal probability of detecting the photon in different output modes.

5.4. Example Photonic Bell State Generator Circuit

A Bell pair is a pair of qubits in any type of maximally entangled state referred to as a Bell state. For dual rail encoded qubits, examples of Bell states (also referred to as the Bell basis states) include:

$$|\Phi^+\rangle = \frac{|0\rangle_L|0\rangle_L + |1\rangle_L|1\rangle_L}{\sqrt{2}} = \frac{|1010\rangle + |0101\rangle}{\sqrt{2}}$$

$$|\Phi^-\rangle = \frac{|0\rangle_L|0\rangle_L - |1\rangle_L|1\rangle_L}{\sqrt{2}} = \frac{|1010\rangle - |0101\rangle}{\sqrt{2}}$$

$$|\Psi^+\rangle = \frac{|0\rangle_L|1\rangle_L + |1\rangle_L|0\rangle_L}{\sqrt{2}} = \frac{|1001\rangle + |0110\rangle}{\sqrt{2}}$$

$$|\Psi^-\rangle = \frac{|0\rangle_L|1\rangle_L - |1\rangle_L|0\rangle_L}{\sqrt{2}} = \frac{|1001\rangle - |0110\rangle}{\sqrt{2}}$$

In a computational basis (e.g., logical basis) with two states, a Greenberger-Horne-Zeilinger state is a quantum superposition of all qubits being in a first state of the two states superposed with all of qubits being in a second state. Using logical basis described above, the general M-qubit GHZ state can be written as:

$$|GHZ\rangle = \frac{|0\rangle^{\otimes M} + |1\rangle^{\otimes M}}{\sqrt{2}}$$

Figure 15:
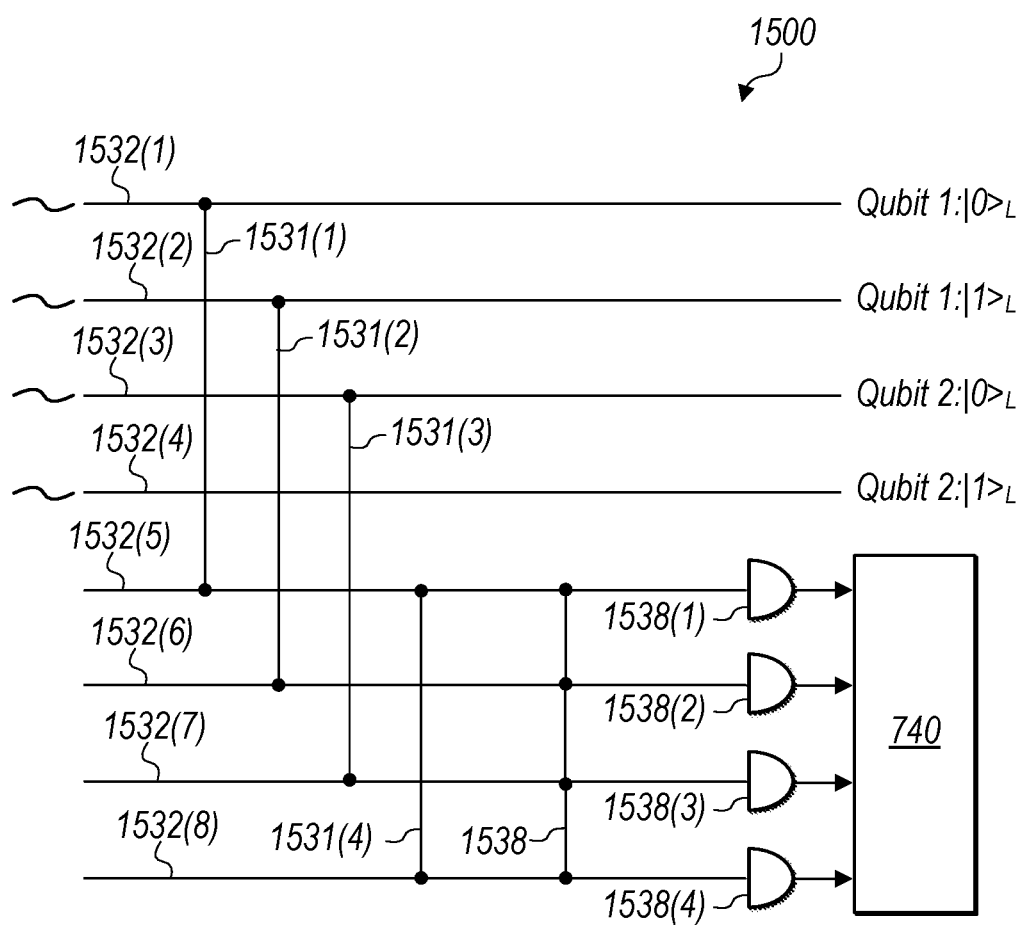
FIG. 15 shows one example of a Bell state generator circuit that can be used in some dual-rail-encoded photonic embodiments.

In some embodiments, entangled states of multiple photonic qubits can be created by coupling modes of two (or more) qubits and performing measurements on other modes. By way of example, FIG. 15 shows a circuit diagram for a Bell state generator 1500 that can be used in some dual-rail-encoded photonic embodiments. In this example, modes 1532(1)-1532(4) are initially each occupied by a photon (indicated by a wavy line); modes 1532(5)-1532(8) are initially vacuum modes. (Those skilled in the art will appreciate that other combinations of occupied and unoccupied modes can be used.)

A first-order mode coupling (e.g., implementing transfer matrix T of Eq. (4)) is performed on pairs of occupied and unoccupied modes as shown by mode couplers 1531(1)-1531(4). Thereafter, a mode-information erasure coupling (e.g., implementing a four-mode mode spreading transform as shown in FIG. 13) is performed on four of the modes (modes 1532(5)-1532(8)), as shown by mode coupler 1537. Modes 1532(5)-1532(8) act as "heralding" modes that are measured and used to determine whether a Bell state was successfully generated on the other four modes 1532(1)-1532(4). For instance, detectors 1538(1)-1538(4) can be coupled to the modes 1532(5)-1532(8) after second-order mode coupler 1537. Each detector 1538(1)-1538(4) can output a classical data signal (e.g., a voltage level on a conductor) indicating whether it detected a photon (or the number of photons detected). These outputs can be coupled to classical decision logic circuit 1540, which determines whether a Bell state is present on the other four modes 1532(1)-1532(4) based on the classical output data. For example, decision logic circuit 1540 can be configured such that a Bell state is confirmed (also referred to as "success" of the Bell state generator) if and only if a single photon was detected by each of exactly two of detectors 1538(1)-1538(4). Modes 1532(1)-1532(4) can be mapped to the logical states of two qubits (Qubit 1 and Qubit 2), as indicated in FIG. 15. Specifically, in this example, the logical state of Qubit 1 is based on occupancy of modes 1532(1) and 1532(2), and the logical state of Qubit 2 is based on occupancy of modes 1532(3) and 1532(4). It should be noted that the operation of Bell state generator 1500 can be non-deterministic; that is, inputting four photons as shown does not guarantee that a Bell state will be created on modes 1532(1)-1532(4). In one implementation, the probability of success is 4/32.

In some embodiments, it is desirable to form resource states of multiple entangled qubits (typically 3 or more qubits, although the Bell state can be understood as a resource state of two qubits). One technique for forming larger entangled systems is through the use of a "fusion" gate. A fusion gate receives two input qubits, each of which is typically part of an entangled system. The fusion gate performs a "fusion" operation on the input qubits that produces either one ("type I fusion") or zero ("type II fusion") output qubits in a manner such that the initial two entangled systems are fused into a single entangled system. Fusion gates are specific examples of a general class of two-particle projective measurements that can be employed to create entanglement between qubits and are particularly suited for photonic architectures. Examples of type I and type II fusion gates will now be described.

6. Examples of Fusion Gate Photonic Circuits

Figure 16:
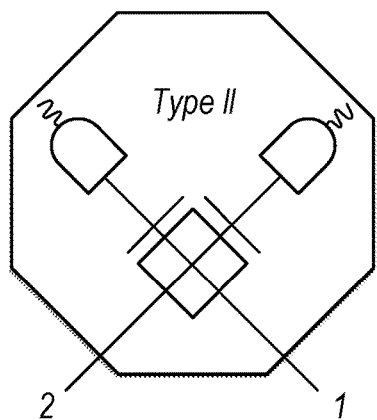
FIG. 16 shows an example of a Type II fusion circuit for a polarization encoding according to some embodiments.
Figure 17:
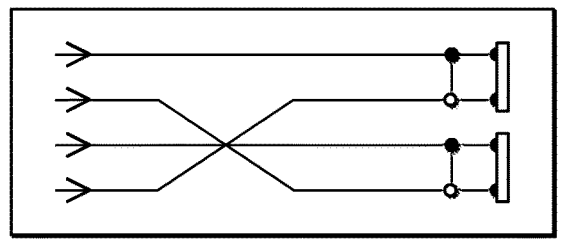
FIG. 17 shows an example of a Type II fusion circuit for a path encoding according to some embodiments.

FIGS. 16-21 show some embodiments of photonic circuit implementation of fusion gates, or fusion circuits, for photonic qubits that can be used according to some embodiments using Type II fusion. It should be understood that these example embodiments are illustrative and not limiting. More generally, as used herein, the term "fusion gate" refers a device that can implement a two-particle projective measurement, e.g., a Bell projection which, depending on the Bell basis chosen, can measure two operators e.g., the operators XX, ZZ, the operators XX, ZY, and the like. A Type II fusion circuit (or gate), in the polarization encoding, takes two input modes, mixes them at a polarization beam splitter (PBS) and then rotates each of them by 45° before measuring them in the computational basis. FIG. 16 shows an example. In the path encoding, a Type II fusion circuit takes four modes, swaps the second and fourth, applies a 50:50 beamsplitter between the two pairs of adjacent modes and then detects them all. FIG. 17 shows an example.

Fusion gates can be used in the construction of larger entangled states by making use of the so-called "redundant encoding: of qubits. This consists in a single qubit being represented by multiple photons, i.e.

$$\alpha|0\rangle + \beta|1\rangle \to \alpha|0\rangle^{\otimes n} + \beta|0\rangle^{\otimes n}$$

so that the logical qubit is encoded in individual qubits. This is achieved by measuring adjacent qubits in the X basis.

This encoding, denoted graphically as n qubits with no edges between them (as in diagram (b) of FIG. 18), has the advantage that a Pauli measurement on the redundant qubits does not split the cluster, but rather removes the photon measured from the redundant encoding and combine the adjacent qubits into one single qubit that inherits the bonds of the input qubits, maybe adding a phase. In addition, another advantage of this type of fusion is that it is loss tolerant. Both modes are measured, so there is no way to obtain the detection patterns that herald success if one of the photons is lost. Finally, Type II fusion does not require the discrimination between different photon numbers, as two detectors need to click for the heralding of successful fusion and this can only happen if the photon count at each detector is 1.

Figure 18A:
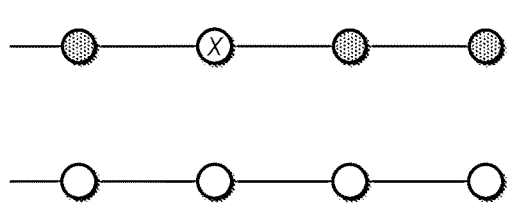
FIGS. 18A-18D show effects of fusion in the generation of a cluster state according to some embodiments.
Figure 18B:
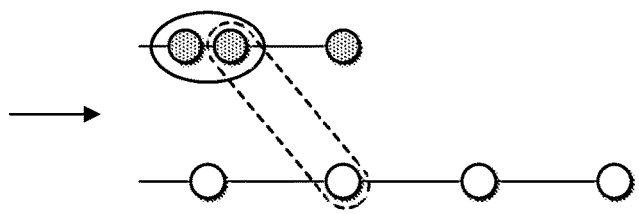
Figure 18C:
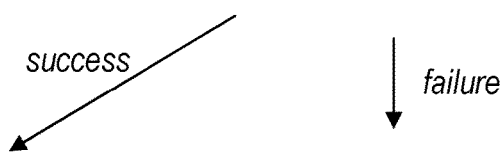
Figure 18C:
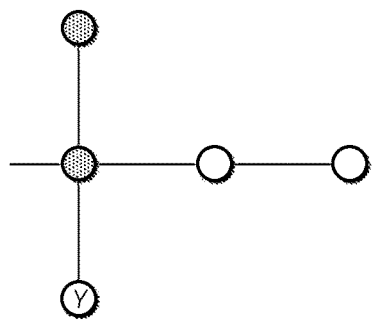
Figure 18D:
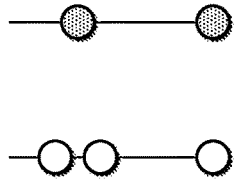

The fusion succeeds with probability 50%, when a single photon is detected at each detector in the polarization encoding. In this case, it effectively performs a Bell state measurement on the qubits that are sent through it, projecting the pair of logical qubits into a maximally entangled state. When the gate fails (as heralded by zero or two photons at one of the detectors), it performs a measurement in the computational basis on each of the photons, removing them from the redundant encoding, but not destroying the logical qubit. The effect of the fusion in the generation of the cluster is depicted in FIGS. 18A-18D, where FIGS. 18A and 18B show the measurement of a qubit in the linear cluster in the X basis to join it with its neighbor into a single logical qubit, and FIGS. 18C and 18D show the effect that success and failure of the gate have on the structure of the cluster. It can be seen that a successful fusion allows to build two-dimensional clusters.

A correspondence can be retrieved between the detection patterns and the Kraus operators implemented by the gate on the state. In this case, since both qubits are detected, these are the projectors:

$$h_1h_2, v_1v_2 \to \frac{h_1h_2 + v_1v_2}{\sqrt{2}}$$

$$h_1v_2, v_1h_2 \to \frac{h_1h_2 - v_1v_2}{\sqrt{2}}$$

$$h_1^2, v_1^2 \to \pm h_1v_2$$

$$h_2^2, v_2^2 \to \pm v_1h_2,$$

where the first two lines correspond to 'success' outcomes, projecting the two qubits into a Bell state, and the bottom two to 'failure' outcomes, in which case the two qubits are projected into a product state.

In some embodiments, the success probability of Type II fusion can be increased by using ancillary Bell pairs or pairs of single photons. Employing a single ancilla Bell pair or two pairs of single photons allows to boost the success probability to 75%.

One technique used to boost the fusion gate comes from the realization that, when it succeeds, it is equivalent to a Bell state measurement on the input qubits. Therefore, increasing the success probability of the fusion gate corresponds to increasing that of the Bell state measurement it implements. Two different techniques to improve the probability of discriminating Bell states have been developed by Grice (using a Bell pair) and Ewert & van Loock (https://arxiv.org/pdf/1403.4841.pdf) (using single photons).

The former showed that an ancillary Bell pair allows to achieve a success probability of 75%, and the procedure can be iterated, using increasingly complex interferometers and large entangled states, to reach arbitrary success probability, in theory. However, the complexity of the circuit and the size of the entangled states necessary may make this impractical.

The second technique makes use of four single photons, input in two modes in pairs with opposite polarization, to boost the probability of success to 75%. It has also been shown numerically that the procedure can be iterated a second time to obtain a probability of 78.125%, but it has not been shown to be able to increase the success rate arbitrarily as the other scheme.

Figure 19:
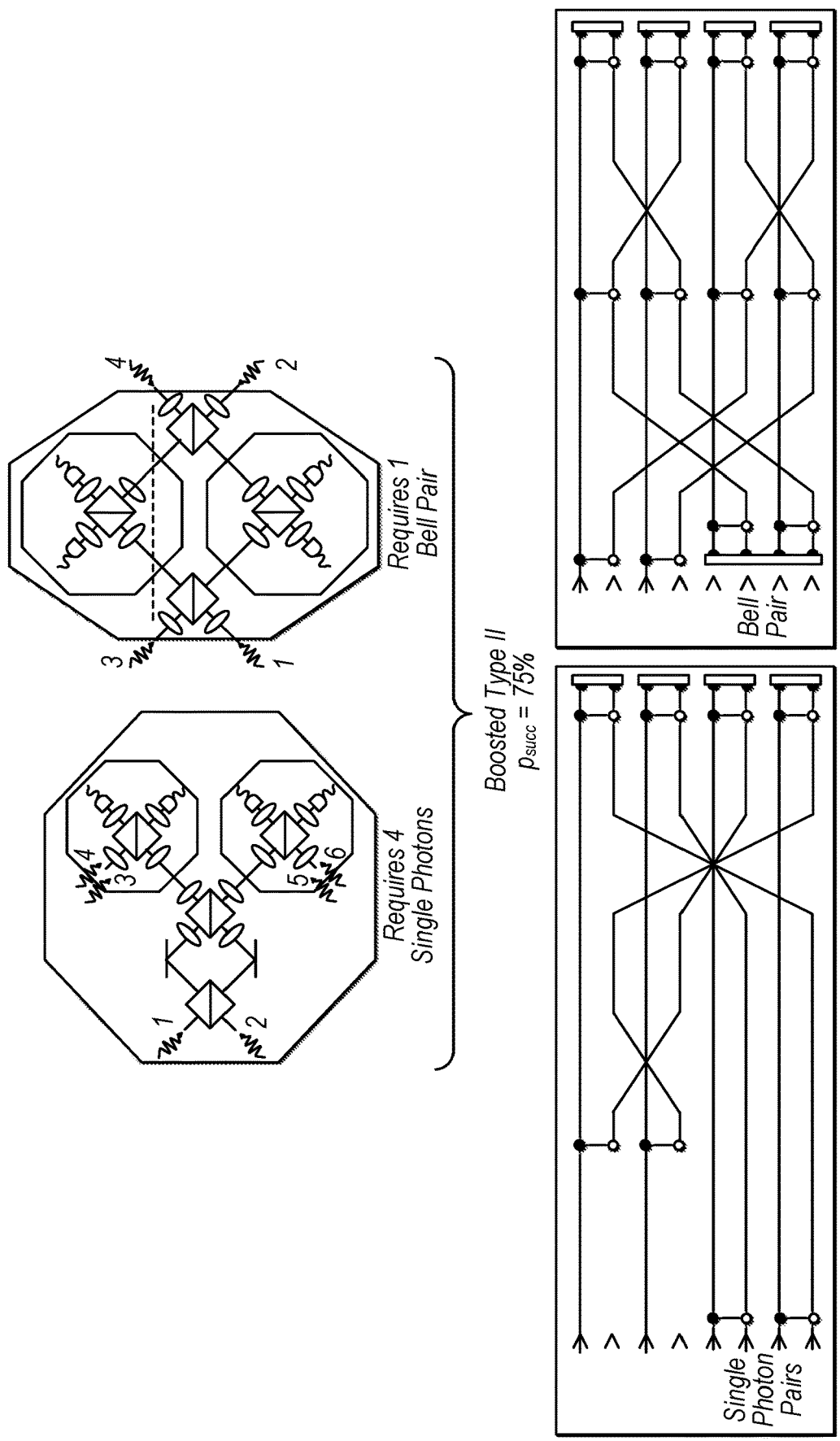
FIG. 19 shows examples of Type II fusion gates boosted once in polarization and path encodings according to some embodiments.

FIG. 19 shows the Type II fusion gate boosted once using these two techniques, both in polarization and path encoding. The success probability of both circuits is 75%.

The detection patterns that herald success of the fusion are described below for the two types of circuit.

When a Bell state is used to boost the fusion, the logic behind the 'success' detection patterns is best understood by considering the detectors in two pairs: the group corresponding to the input photon modes (modes 1 and 2 in polarization and the top 4 modes in path-encoding) and that corresponding to the Bell pair input modes (modes 3 and 4 in polarization and the bottom 4 modes in path-encoding). Call these the 'main' and 'ancilla' pairs respectively. Then a successful fusion is heralded whenever: (a) 4 photons are detected in total; and (b) fewer than 4 photons are detected in each group of detectors.

When 4 single photons are used as ancillary resources, success of the gate is heralded whenever: (a) 6 photons are detected overall; and (b) fewer than 4 photons are detected at each detector.

When the gates succeeds, the two input qubits are projected onto one of the four Bell pairs, as these can be all discriminated from each other thanks to the use of the ancillary resources. The specific projection depends on the detection pattern obtained, as before.

Both the boosted Type II fusion circuits, designed to take one Bell pair and four single photons as ancillae respectively, can be used to perform Type II fusion with variable success probabilities, if the ancillae are not present or if only some of them are (in the case of the four single photon ancillae). This is particularly useful because it allows to employ the same circuits to perform fusion in a flexible way, depending on the resources available. If the ancillae are present, they can be input in the gates to boost the probability of success of the fusion. If they are not, however, the gates can still be used to attempt fusion with a lower but non-zero success probability.

As far as the fusion gate boosted using one Bell pair is concerned, the only case to be considered is that of the ancilla being absent. In this case, the logic of the detection patterns heralding success can be understood by considering the detectors in the pairs described above again. The fusion is still successful when: (a) 2 photons are detected at different detectors; and (b) 1 photon is detected in the 'principal' pair and 1 photon is detected in the 'ancilla' pair of detectors.

In the case of the circuit boosted using four single photons, multiple modifications are possible, removing all or part of the ancillae. This is analogous to the Boosted Bell State Generator, which is based on the same principle.

First consider the case of no ancillae being present at all. As expected, the fusion is successful with probability 50%, which is the success rate of the non-boosted fusion. In this case, the fusion is successful whenever 2 photons are detected at any two distinct detectors.

As for the boosted BSG, the presence of an odd number of ancillae turns out to be detrimental to the success probability of the gate: if 1 photon is present, the gate only succeeds 32.5% of the time, whereas if 3 photons are present, the success probability is 50%, like the non-boosted case.

If only two of the four ancillae are present, two effects are possible.

If they are input in different modes in the polarization encoding, i.e. different adjacent pairs of ancillary modes in the path encoding, the probability of success is lowered to 25%.

However, if the two ancillae are input in the same polarization mode, i.e. in the same pair of adjacent modes in the path encoding, the success probability is boosted up to 62.5%. In this case, the patterns that herald success can be understood again by grouping the detectors in two pairs: the pair in the branch of the circuit where the ancillae are input (group 1) and the pair in the other branch (group 2). This distinction is particularly clear in the polarization-encoded diagram. Considering these groups, the fusion if successful when: (a) 4 photons are detected overall; (b) fewer than 4 photons are detected at each detector in group 1; and (c) fewer than 2 photons are detected at each detector in group 2.

In these examples, the fusion gates work by projecting the input qubits into a maximally entangled state when successful. The basis such a state is encoded in can be changed by introducing local rotations of the input qubits before they enter the gate, i.e. before they are mixed at the PBS in the polarization encoding. Changing the polarization rotation of the photons before they interfere at the PBS yields different subspaces onto which the state of the photons is projected, resulting in different fusion operations on the cluster states. In the path encoding, this corresponds to applying local beamsplitters or combinations of beamsplitters and phase shifts corresponding to the desired rotation between the pairs of modes that constitute a qubit (neighboring pairs in the diagrams above).

This can be useful to implement different types of cluster operations, both in the success and the failure cases, which can be very useful to optimize the construction of a big cluster state from small entangled states.

Figure 20:
FIG. 20 shows a table with variations of the Type II fusion gate for different measurement basis in a polarization encoding.

FIG. 20 shows a table with the effects of a few rotated variations of the Type II fusion gate used to fuse two small entangled states. The diagram of the gate in the polarization encoding, the effective projection performed and the final effect on the cluster state are shown.

Figure 21:
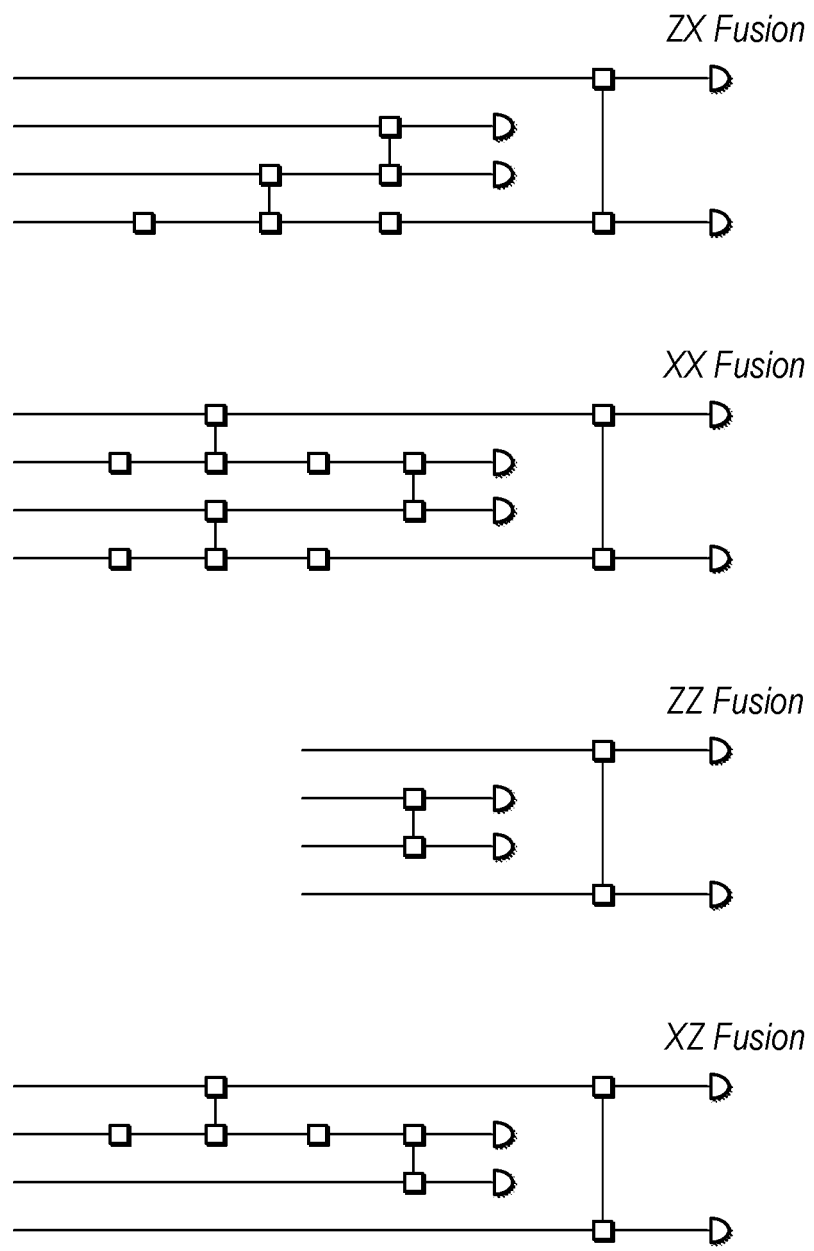
FIG. 21 shows examples of photonic circuit variations of the Type II fusion gate for different choice of measurement basis in a path encoding according to some embodiments.

Rotation to different basis states is further illustrated in FIG. 21, which shows examples of photonic circuits for Type II fusion gate implementations using a path encoding. Shown are fusion gates for ZX fusion, XX fusion, ZZ fusion, and XZ fusion. In each instance a combination of beam splitters and phase shifters (e.g., as described above) can be used.

7. Additional Embodiments

Those skilled in the art with access to this disclosure will appreciate that embodiments described herein are illustrative and not limiting and that many modifications and variations are possible. The measurements performed and the states on which they act can be chosen such that the measurement outcomes have redundancies that give rise to fault tolerance. For instance, a code can be directly entered with the measurements, or correlations can be generated in the measurements that directly deal with both the destructiveness of the measurement and the entanglement breaking nature of the measurement in a fault tolerant manner. This can be handled as part of the classical decoding; for instance, failed fusion operations can be dealt with as erasure by the code.

With reference to the appended figures, components that can include memory can include non-transitory machine-readable media. The terms "machine-readable medium" and "computer-readable medium" as used herein refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media, punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In some implementations, operations or processing may involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining," or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, compact disc read-only memory (CD-ROM) or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls.

What is claimed is:

1. A photonic integrated circuit comprising:
a plurality of optical detector circuits,
an optical detector circuit of the plurality of optical detector circuits including
a plurality of input waveguides to receive a first photon and a second photon and
a set of photon detectors to generate measurement data by detecting the first photon and the second photon,
the plurality of input waveguides comprising a first pair of input waveguides that are coupled to a first interferometer and a second pair of input waveguides that are coupled to a second interferometer,
the first interferometer comprising one or more first phase shifters and the second interferometer comprising one or more second phase shifters,
the first interferometer coupled to the set of photon detectors using one or more first output waveguides,
the second interferometer coupled to the set of photon detectors using one or more second output waveguides,
the one or more first output waveguides and the one or more second output waveguides being coupled together using one or more directional couplers;
a first electrical control line to control a first phase shift applied by the first phase shifter;
a second electrical control line to control a second phase shift applied by the second phase shifter;
a memory to store the measurement data generated by the set of photon detectors; and
an optical memory comprising photonic delay lines that temporarily store one or more photons before the one or more photons are input into one or more of the optical detector circuits.

2. The photonic integrated circuit of claim 1, wherein another optical detector circuit of the plurality of optical detector circuits generates additional measurement data using an additional set of photon detectors to detect additional photons, the another optical detector circuit comprising additional phase shifters having phase shifts that are controlled by additional electrical control lines, and wherein the memory stores the additional measurement data.

3. The photonic integrated circuit of claim 2, wherein the one or more first phase shifters and the one or more second phase shifters do not apply a phase shift and the measurement data is ZZ measurement data.

4. The photonic integrated circuit of claim 3, wherein the additional phase shifters of the another optical detector circuit applies a phase shift to the additional photons, and wherein the additional measurement data is XX measurement data.

5. The photonic integrated circuit of claim 1, wherein the photonic delay lines are optical fibers.

6. The photonic integrated circuit of claim 1, wherein the first photon is generated at a first time and the second photon is generated at an earlier time that is before the first time, and wherein the second photon is stored in the optical memory such that detections of the first photon and the second photon by the set of photon detectors coincide to generate the measurement data.

7. The photonic integrated circuit of claim 1, further comprising a photon source system that generates the first photon and the second photon.

8. The photonic integrated circuit of claim 7, wherein the photon source system generates the first photon and the second photon using spontaneous parametric down conversion.

* * * * *